US012628087B2

(12) United States Patent
Kanaya et al.

(10) Patent No.: US 12,628,087 B2
(45) Date of Patent: May 12, 2026

(54) TERMINAL, COMMUNICATION DEVICE, AND COMMUNICATION METHOD

(71) Applicant: Panasonic Intellectual Property Corporation of America, Torrance, CA (US)

(72) Inventors: Hiroyuki Kanaya, Ishikawa (JP); Takashi Iwai, Ishikawa (JP); Tomofumi Takata, Ishikawa (JP); Yoshio Urabe, Nara (JP); Taichi Miura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 399 days.

(21) Appl. No.: 18/248,819

(22) PCT Filed: Aug. 12, 2021

(86) PCT No.: PCT/JP2021/029726
§ 371 (c)(1),
(2) Date: Apr. 12, 2023

(87) PCT Pub. No.: WO2022/079992
PCT Pub. Date: Apr. 21, 2022

(65) Prior Publication Data

US 2023/0422179 A1 Dec. 28, 2023

(30) Foreign Application Priority Data

Oct. 15, 2020 (JP) ................................. 2020-174019

(51) Int. Cl.
*H04W 52/14* (2009.01)
*H04W 52/24* (2009.01)

(52) U.S. Cl.
CPC ....... *H04W 52/146* (2013.01); *H04W 52/243* (2013.01)

(58) Field of Classification Search
CPC . H04W 52/146; H04W 52/243; H04W 52/24; H04W 52/241; H04W 52/281
See application file for complete search history.

(56) References Cited

U.S. PATENT DOCUMENTS

2017/0325178 A1 11/2017 Verma et al.
2018/0220456 A1 8/2018 Kim et al.
(Continued)

FOREIGN PATENT DOCUMENTS

JP 2018535596 A 11/2018
JP 2019515566 A 6/2019
(Continued)

OTHER PUBLICATIONS

Extended European Search Report, dated Mar. 18, 2024, for European Patent Application 1 No. 21879734.8-1216. (9 pages).
(Continued)

*Primary Examiner* — John J Lee
(74) *Attorney, Agent, or Firm* — Seed Intellectual Property Law Group LLP

(57) ABSTRACT

This terminal comprises: a control circuit that determines, on the basis of a plurality of signals received from a plurality of transmission sources that carry out uplink cooperative communication, the uplink transmission power; and a transmission circuit that carries out uplink transmission via the determined transmission power.

14 Claims, 19 Drawing Sheets

(56) References Cited

U.S. PATENT DOCUMENTS

| | | | |
|---|---|---|---|
| 2018/0235002 A1 | 8/2018 | Son et al. | |
| 2019/0166590 A1* | 5/2019 | Verma | H04L 5/0023 |
| 2020/0329393 A1 | 10/2020 | Morioka | |
| 2020/0336989 A1* | 10/2020 | Rong | H04W 52/246 |
| 2021/0235386 A1* | 7/2021 | Zhang | H04W 52/42 |

FOREIGN PATENT DOCUMENTS

| | | |
|---|---|---|
| KR | 20130036383 A | 4/2013 |
| WO | WO 2013051824 A1 | 4/2013 |
| WO | 2013128605 A1 | 9/2013 |
| WO | WO 2019131199 A1 | 7/2019 |
| WO | WO 2020082711 A1 | 4/2020 |

OTHER PUBLICATIONS

Guo et al., "A unified transmission procedure for multi-AP coordination," IEEE 802.11-19/1102r0, Jul. 2, 2019. (8 pages).

Han et al., "Coordinated Spatial Reuse: Extension to Uplink," IEEE 802.11-20/1040r1, Jul. 10, 2020. (16 pages).

IEEE Computer Society, "IEEE P802.11ax™M/D6.0 Draft Standard for Information technology—Tele-communications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," IEEE P802.11ax™M/D6.0, Nov. 2019. (780 pages).

International Search Report, mailed Nov. 9, 2021, for International Patent Application No. PCT/JP2021/029726. (9 pages) (with English Translation).

Park et al., "Multi-AP Transmission Procedure," IEEE 802.11-19/0048r0, Mar. 11, 2019. (19 pages).

Park et al., "Multi-AP Transmission Procedure," IEEE 802.11-19/0804r0, May 13, 2019. (14 pages).

Schelstraete et al., "Joint Beamforming protocol simulation," IEEE 802.11-19/0092, Jan. 11, 2019. (16 pages).

* cited by examiner

| Type value B3 B2 | Type description | Subtype value B7 B6 B5 B4 | Subtype description |
|---|---|---|---|
| 01 | Control | 0000-0010, 0011 | Reserved |
| 01 | Control | 0010 | Trigger |
| 01 | Control | 0101 | VHT/HE NDP Announcement |

FIG. 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 7

| Trigger Type | . . . | AP TX Power | . . . | ACCEPTABLE INTERFERENCE POWER | . . . |
|---|---|---|---|---|---|

| AP-ID | RU Alocaton | ACCEPTABLE INTERFERENCE POWER |
|---|---|---|

| Trigger Type | Length | ··· | BW | ··· | TX Power | ··· | UL/DL Flag | ··· |
|---|---|---|---|---|---|---|---|---|

| AP ID | Resource Allocation | MAP Type | ··· | MAP Type Dependent Info |
|---|---|---|---|---|

C-SR    ACCEPTABLE INTERFERENCE POWER/ MAXIMUM TRANSMISSION POWER

JT    ······

CBF    ······

C-OFDMA    No info

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Multi-AP |
| 9-15 | Reserved |

FIG. 22

| Type value B3 B2 | Type description | Subtype value B7 B6 B5 B4 | Subtype description |
|---|---|---|---|
| 01 | Control | 0000~0001 | Reserved |
| 01 | Control | 0001 | MAP Trigger |
| 01 | Control | 0010 | Trigger |
| 01 | Control | 0101 | VHT/HE NDP Announcement |

FIG. 24

TERMINAL, COMMUNICATION DEVICE, AND COMMUNICATION METHOD

TECHNICAL FIELD

The present disclosure relates to a terminal, a communication apparatus, and a communication method.

BACKGROUND ART

The technical specification of the Institute of Electrical and Electronics Engineers (IEEE) 802.11be (hereinafter, referred to as "11be") has been developed as the successor standard of 802.11ax (hereinafter, referred to as "11ax"), which is a standard of IEEE 802.11.

In 11be, application of cooperated communication of an uplink (UL) has been discussed.

CITATION LIST

Non-Patent Literature

NPL 1
IEEE 802.11-19/1102r0, A unified transmission procedure for multi-AP coordination, July 2019
NPL 2
IEEE 802.11-20/1040r1, Coordinated Spatial Reuse: Extension to Uplink. July 2020
NPL 3
IEEE P802.11ax/D6.0. November 2019

SUMMARY OF INVENTION

There is scope for further study, however, on a method for transmission power control in coordinated communication of the uplink.

One non-limiting and exemplary embodiment of the present disclosure facilitates providing a terminal, a communication apparatus, and a communication method each capable of enhancing efficiency of transmission power control in coordinated communication of the uplink.

A terminal according to an embodiment of the present disclosure includes: control circuitry, which, in operation, determines transmission power of an uplink based on a plurality of signals received from a plurality of transmission sources performing coordinated communication of the uplink; and transmission circuitry, which, in operation, performs uplink transmission with the determined transmission power.

It should be noted that a general or specific embodiment may be implemented as a system, an apparatus, a method, an integrated circuit, a computer program, a storage medium, or any selective combination thereof.

According to an embodiment of the present disclosure, efficiency of transmission power control in coordinated communication can be enhanced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4 illustrates exemplary types of a Medium Access Control (MAC) frame;

FIG. 7 illustrates exemplary Trigger Types:

FIG. 22 illustrates exemplary Trigger Types:

FIG. 24 illustrates exemplary types of the MAC frame.

DESCRIPTION OF EMBODIMENTS

Hereinafter, embodiments of the present disclosure will be described in detail with reference to the accompanying drawings.

[Coordinated Communication]

In 11be, for example, application of Multi-AP (hereinafter, referred to as "MAP") coordination (hereinafter, referred to as "coordinated communication") has been discussed, in which data transmission and reception between a plurality of access points (also referred to as "base station", hereinafter, referred to as AP) and a plurality of terminals (also referred to as "non-AP station (STA)", hereinafter, referred to as "STA") is performed.

Communication modes include communication from AP to STA (hereinafter, referred to as "DL communication") and communication from STA to AP (hereinafter, referred to as "UL communication"). For the coordinated communication mode, for example, a mode in which two APs cooperatively perform DL communication (hereinafter, referred to as "DL-DL communication"), and a mode in which two APs cooperatively perform UL communication (hereinafter, referred to as "UL-UL communication") have been discussed (e.g., see NPL 1).

Figure 1:
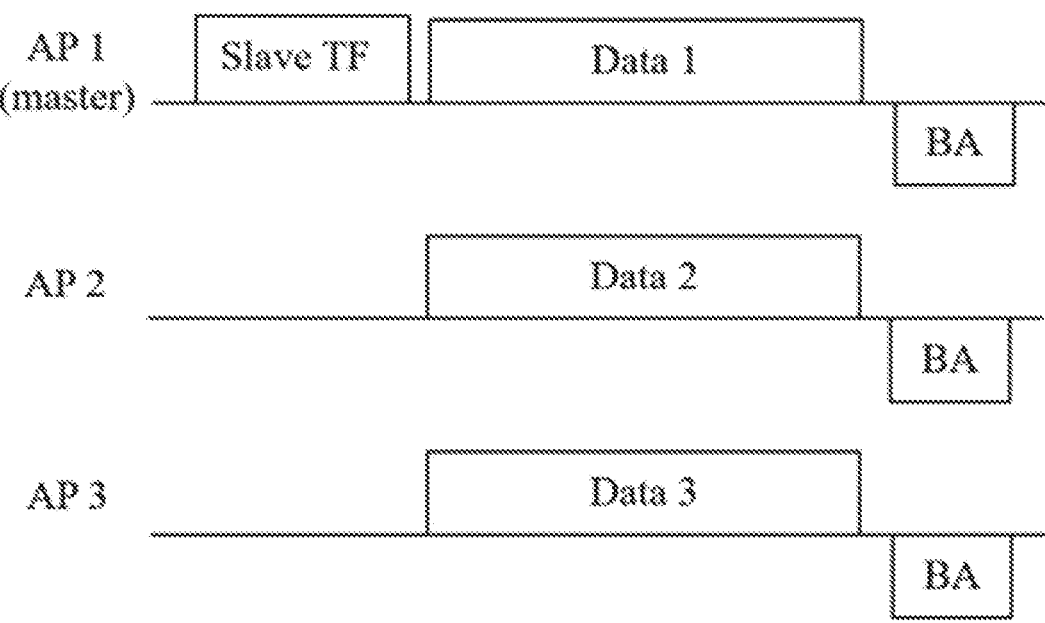
FIG. 1 illustrates an exemplary operation of Downlink (DL)-DL communication.

FIG. 1 illustrates an exemplary operation of DL-DL communication. As illustrated in FIG. 1, APL, which is a master AP for controlling coordinated communication, transmits a trigger frame (e.g., Slave TF) indicating the initiation of coordinated communication to AP2 and AP3, which are slave APs. Then, AP1, AP2, and AP3 cooperate with each other to respectively transmit Data 1, Data 2 and Data 3, which are downlink data.

Figure 2:
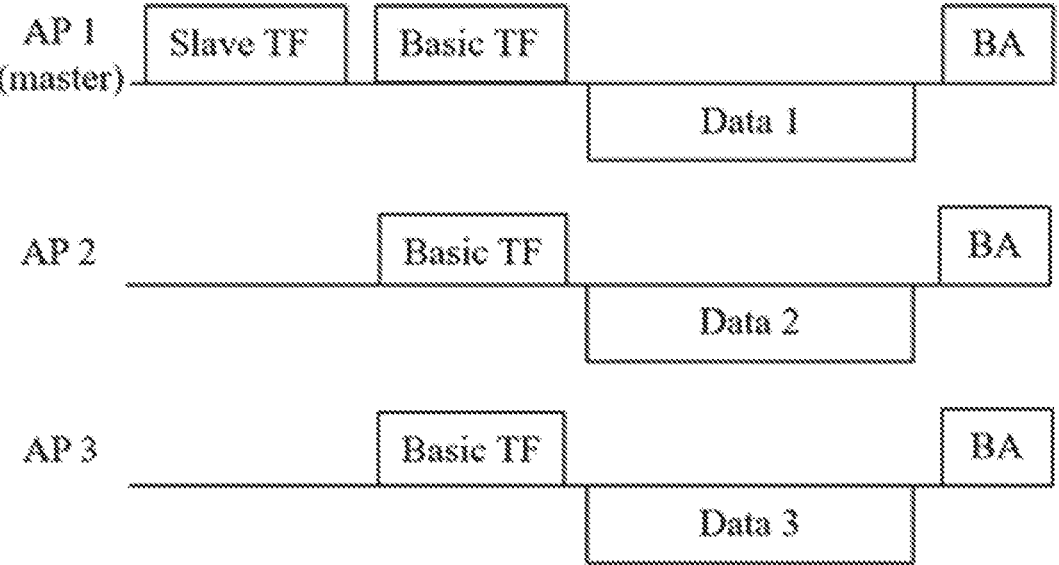
FIG. 2 illustrates an exemplary operation of Uplink (UL)-UL communication.

FIG. 2 illustrates an exemplary operation of UL-UL communication. As illustrated in FIG. 2, AP1, which is a master AP, transmits a trigger frame (e.g., Slave TF) indicating the initiation of coordinated communication, similarly to FIG. 1. Then, AP1, AP2, and AP3 transmit trigger frames (e.g., Basic TF) indicating uplink transmission, respectively. Then, AP1. AP2, and AP3 cooperate with each other to respectively receive Data 1, Data 2 and Data 3, which are uplink data.

Schemes for performing the coordination include, for example, Coordinated spatial reuse (hereinafter, referred to as "C-SR") in which a plurality of APs receive signals using the same frequency band (e.g., see NPL 2).

Figure 3:
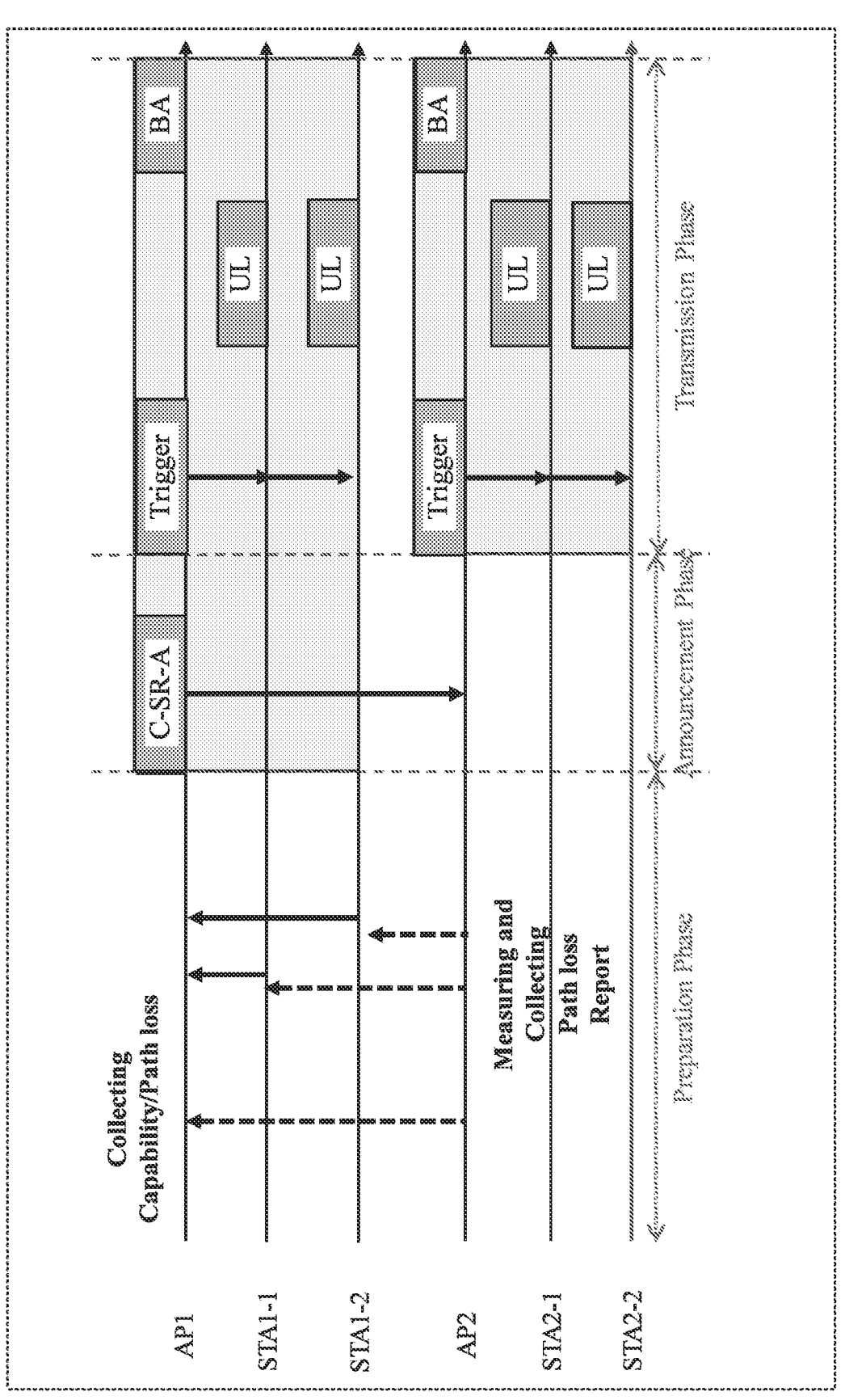
FIG. 3 illustrates an exemplary operation of Coordinated spatial reuse (C-SR)

FIG. 3 illustrates an exemplary operation of UL-UL communication. FIG. 3 exemplarily illustrates an operation to which C-SR is applied (see, e.g., NPL 2).

FIG. 3 illustrates exemplary operations of AP1, AP2, STA1-1, STA1-2, STA2-1, and STA2-2, for example. Note that STA1-1 and STA1-2 are STAs connected to AP1 (or also referred to as configuration elements of Basic Service Set (BSS) of AP1). Further, STA2-1 and STA2-2 are STAs connected to AP2 (or configuration elements of BSS of AP2). For example, AP1 and AP2 may be included in a coordination set (e.g., an AP candidate set) that is a group of AP candidates performing coordinated communication.

Note that the Basic Service Set (BSS) is a basic service set configured with a certain AP and a plurality of STAs. Further, an operation in which an STA connects to an AP in the BSS is called "associate".

In the "Preparation Phase" in FIG. 3, information indicating a capability of each apparatus, information indicating reception power of each apparatus (e.g., Received Signal Strength Indicator (RSSI)), and information on a measurement report (e.g., information on path loss) are aggregated into AP1 (e.g., referred to as a Master AP or a Sharing AP) controlling coordinated communication. For example, as illustrated in FIG. 3, in C-SR, path loss between STA and AP (between STA-AP) included in the coordination set (AP candidate set) may be notified from AP2, which is a slave AP (or referred to as a Shared AP), to AP1, which is a Master AP (or referred to as a Sharing AP).

Further, in the "Announcement Phase" in FIG. 3, AP1 transmits an announcement (C-SR-A) frame to AP2, for example.

Then, the "Transmission Phase" in FIG. 3, data transmission and reception are performed. For example, in FIG. 3, AP1 and AP2 each transmit a trigger frame (Trigger frame) to the associated STAs. Then, AP1 and AP2 cooperate with each other to receive uplink data from STA1-1 and STA1-2, and STA2-1 and STA2-2, respectively.

As described above, trigger frames for notifying STA of transmission control information and transmission timing are transmitted and received in each mode of the coordinated communication. For example, Slave TF and Basic TF as illustrated in FIGS. 1 and 2, and C-SR-A as illustrated in FIG. 3 are ones of trigger frames.

FIG. 4 illustrates exemplary types of a Medium Access Control (MAC) frame in 11ax. In FIG. 4, contents of changes of the value changed in 11ax are illustrated. Note that the contents illustrated in FIG. 4 are the contents illustrated in Table 9-1 of NPL 3.

A trigger frame for indicating UL communication in 11ax includes afield including common information addressed to STAs to be triggered (hereinafter, referred to as a "Common info field") and a field including information addressed to an individual STA (hereinafter, referred to as a "User info field").

Figure 5:
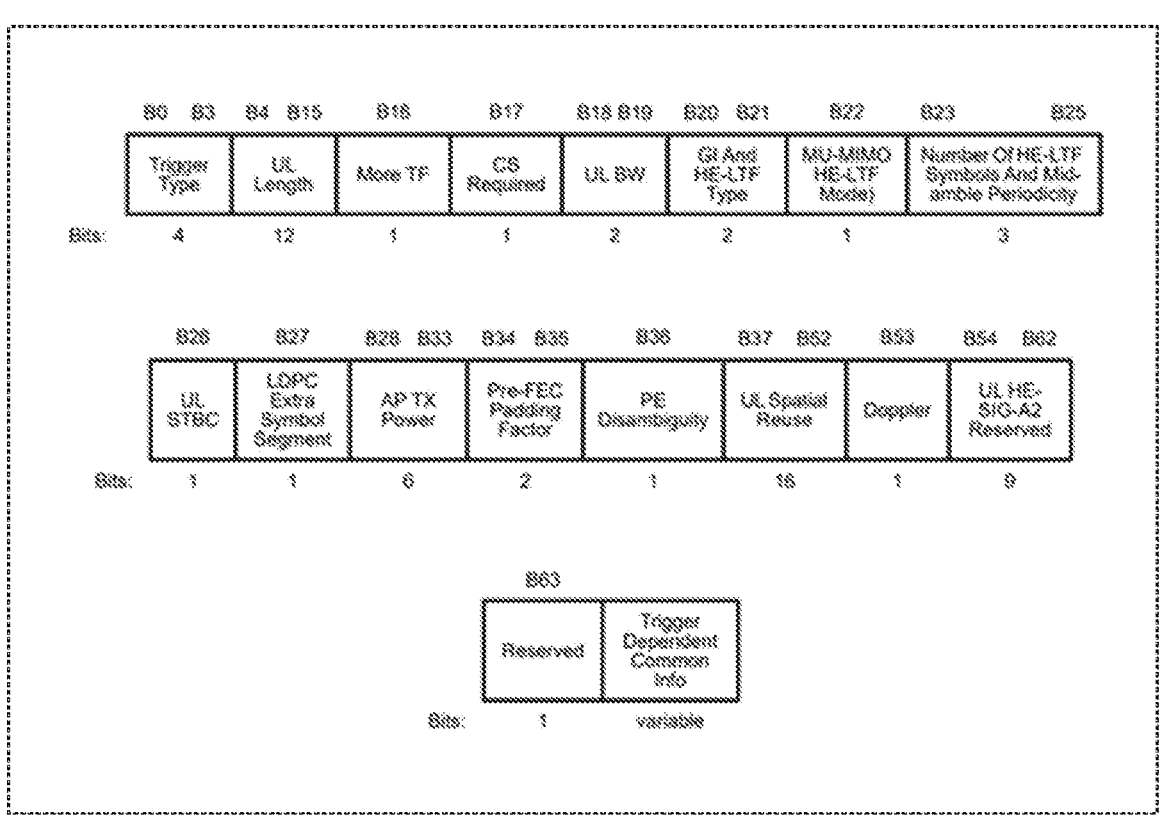
FIG. 5 illustrates an exemplary format of a Common info field.

FIG. 5 illustrates an exemplary format of a Common info field. The format illustrated in FIG. 5 is the same as the format illustrated in FIG. 9-64b of NPL 3, for example. FIG. 5 illustrates a plurality of subfields included in the format of the Common info field. The Common info field includes, for example, AP TX Power (information indicating a transmission power value from AP to STA), as information on transmission power control.

Figure 6:
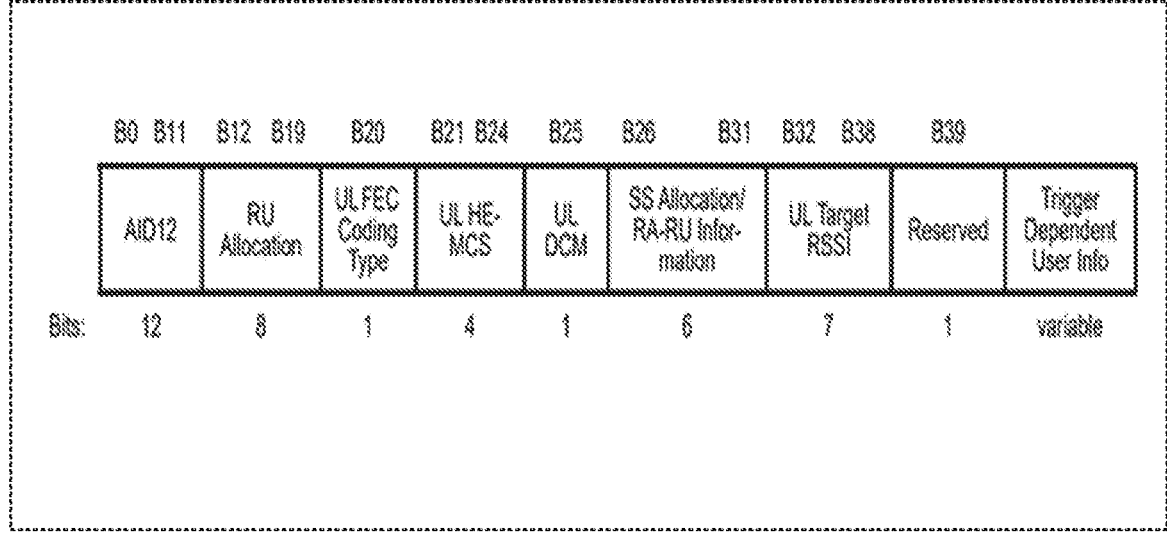
FIG. 6 illustrates an exemplary format of a User info field.

FIG. 6 illustrates an exemplary format of a User info field. The format illustrated in FIG. 6 is the same as the format illustrated in FIG. 9-64d of NPL 3. FIG. 6 illustrates a plurality of subfields included in the format of the User info field. The User info field includes, for example, UL Target RSSI (information on a target reception signal strength of AP in the uplink; also referred to as UL Target Receive Power), as information on transmission power control.

FIG. 7 illustrates exemplary values included in a subfield indicated as "Trigger Type" in a Common info field (hereinafter, simply referred to as a "Trigger Type"). The table illustrated in FIG. 7 is, for example, the same as Table 9-31b of NPL 3.

Figure 8:
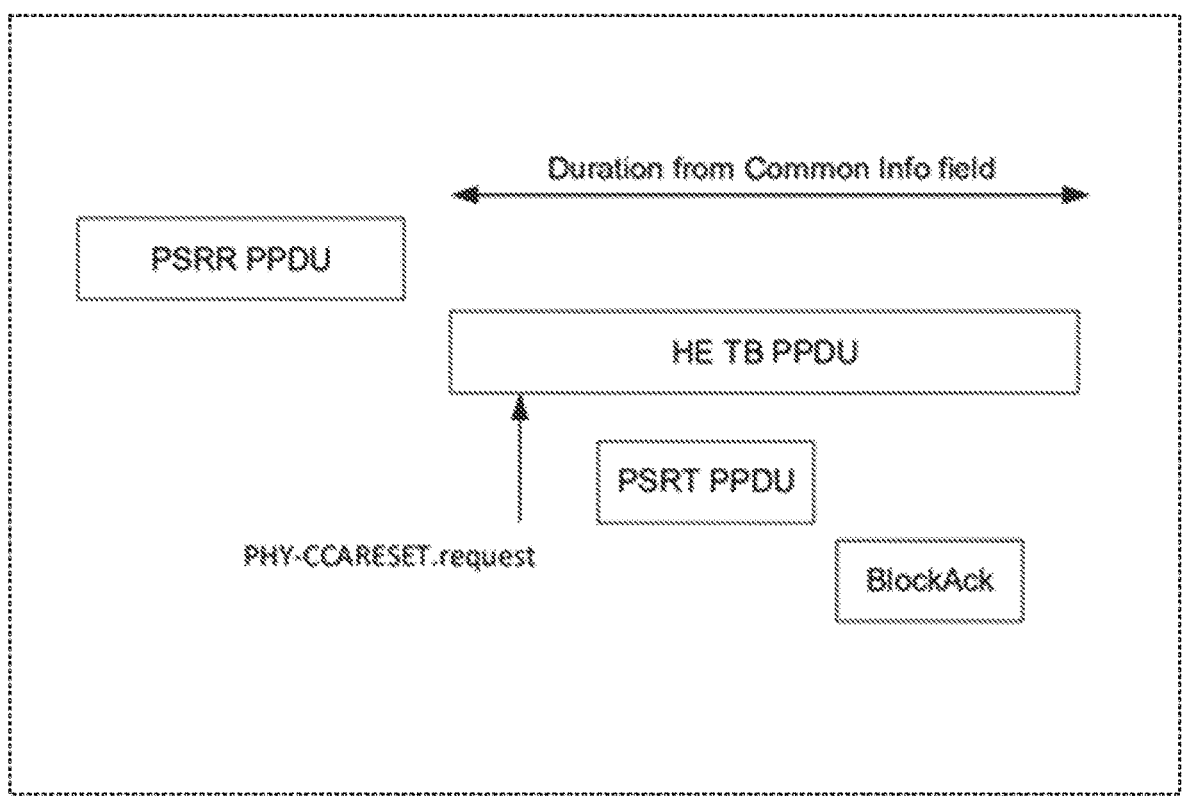
FIG. 8 illustrates an exemplary operation of Parameterized spatial reuse (PSR)-based spatial reuse.

Further, in 11ax, for example, Parameterized spatial reuse (PSR)-based spatial reuse has been discussed (e.g., see NPL 3). FIG. 8 illustrates an exemplary operation of PSR-based spatial reuse. Note that the contents illustrated in FIG. 8 are contents illustrated in FIG. 26-13 of NPL 3.

For example, as illustrated in FIG. 8, a certain AP may transmit a PSR Reception Physical layer convergence procedure Protocol Data Unit (PSRR PPDU), which is a Trigger frame. For example, a Common Info field (e.g., a field common to a plurality of STAs) in the PSRR PPDU may include a value specified by UL spatial reuse.

For example, in FIG. 8, an STA (e.g., an STA under Overlapping BSS (OBSS) or referred to as an OBSS STA) different from an STA under BSS may calculate transmission power of the uplink based on the value specified by UL spatial reuse included in the PSRR PPDU and path loss measured using the PSRR PPDU. Then, the STA under OBSS may transmit an uplink signal (e.g., PSR Transmission PPDU (PSRT PPDU) based on the calculated transmission power.

Note that, in FIG. 8, for example, the STA (e.g., an STA under BSS or referred to as a BSS STA) associated with the AP may transmit an uplink signal (e.g., a High Efficiency Trigger-based PPDU (HE TB PPDU)) based on the information on the uplink transmission power specified by the PSRR PPDU, which is a Trigger frame.

The exemplary coordinated communication has been described above.

However, for example, the transmission power control in UL-UL communication has not been sufficiently discussed. For example, in UL-UL communication illustrated in FIG. 3, information on path loss between STA-AP included in the coordination set is notified to AP1, which is a Master AP, and thus the information amount of the communication between APs may increase.

Thus, in a non-limiting embodiment of the present disclosure, for example, a method for reducing the information amount of the communication between APs and enhancing the efficiency of transmission power control in UL-UL communication will be described.

Embodiment 1

[Exemplary Configuration of Radio Communication System]

A radio communication system according to the embodiment of the present disclosure includes at least two APs and one STA.

Figure 9:
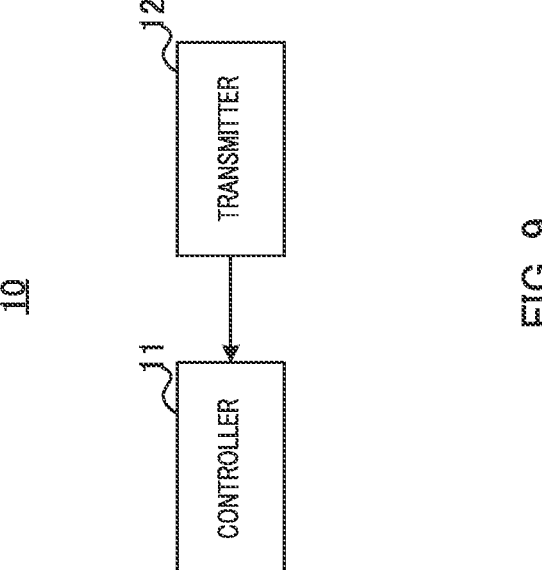
FIG. 9 is a block diagram illustrating an exemplary configuration of a part of a terminal (STA: Station)

FIG. 9 is a block diagram illustrating an exemplary configuration of a part of STA 10. STA 10 illustrated in FIG. 9 includes controller 11 and transmitter 12. Controller 11 (e.g., corresponding to control circuitry) determines uplink transmission power based on a plurality of signals (e.g., Trigger frames) received from a plurality of transmission sources (e.g., AP) that perform uplink coordinated communication. Transmitter 12 (e.g., corresponding to transmission circuitry) performs uplink transmission with the determined transmission power.

Hereinafter, an example in which at least two APs cooperatively perform UL-UL communication will be described. Note that in the following description, the terms "packet" and "frame" are non-limiting examples of "signal".

[Exemplary Configuration of AP]

Figure 10:
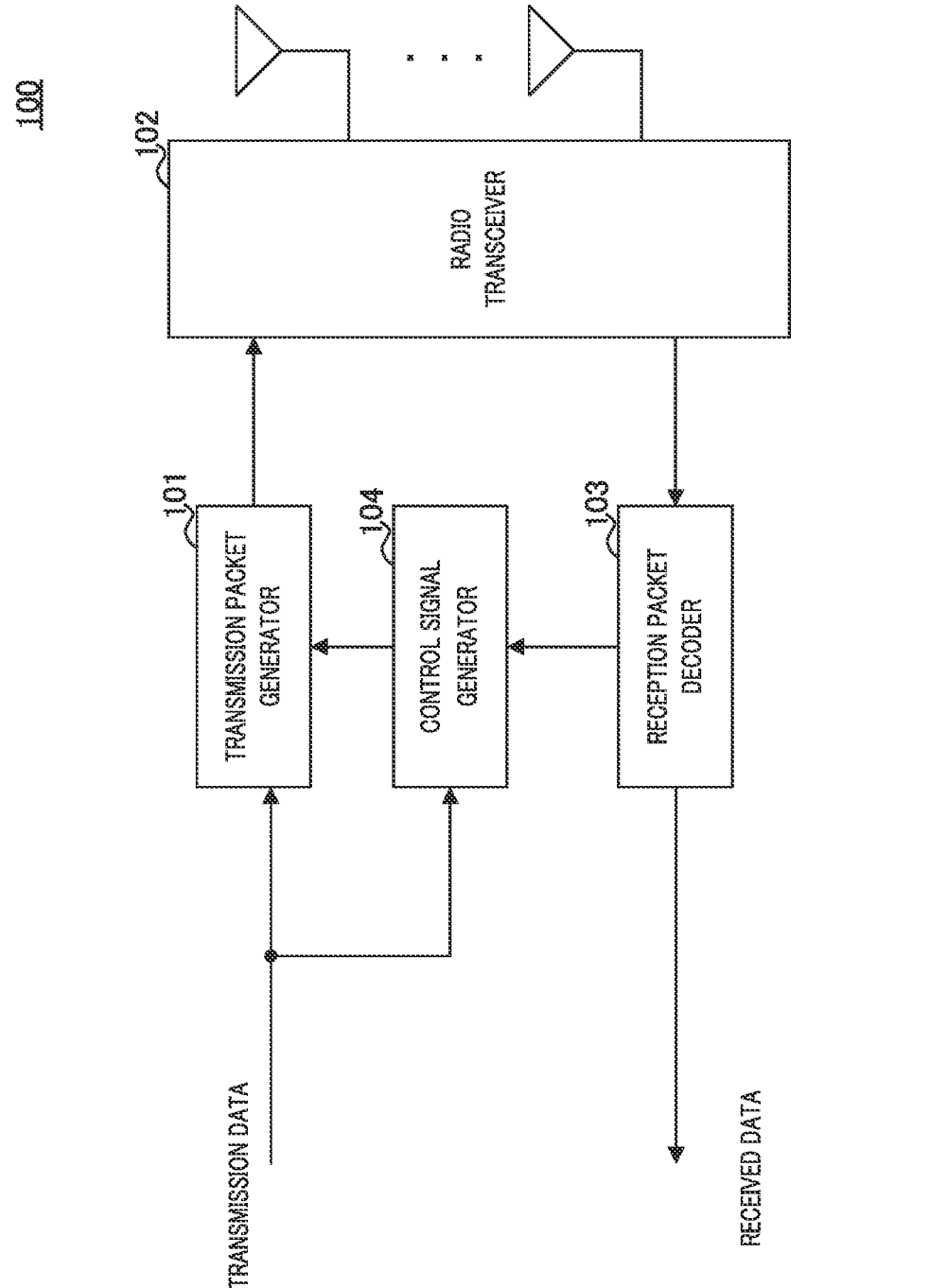
FIG. 10 is a block diagram illustrating an exemplary configuration of an access point (AP: Access Point)

FIG. 10 is a block diagram illustrating an exemplary configuration of AP according to the present embodiment. AP 100 illustrated in FIG. 10 includes transmission packet generator 101, radio transceiver 102, reception packet decoder 103, and control signal generator 104.

Transmission packet generator 101, for example, generates a transmission packet from transmission data received from a processor (not illustrated) in a higher layer and data (e.g., control information) generated by control signal generator 104, and outputs the generated packet to radio transceiver 102.

Radio transceiver 102 converts the transmission packet input from transmission packet generator 101 into a radio transmission signal, and transmits the radio transmission signal via an antenna.

Radio transceiver 102 receives a radio reception signal, converts the radio reception signal into a reception packet, and outputs the reception packet to reception packet decoder 103.

Reception packet decoder 103 decodes the reception packet and outputs the received data input from radio transceiver 102 to a processor (not illustrated) in a higher layer. Alternatively, reception packet decoder 103 decodes the reception packet and outputs the control information to control signal generator 104.

Control signal generator 104 generates control information based on at least one of transmission data, control information input from reception packet decoder 103, and/or the internal state, and outputs the generated control information to transmission packet generator 101. For example, control signal generator 104 may generate control information on a trigger, association, or data communication.

[Exemplary Configuration of STA]

Figure 11:
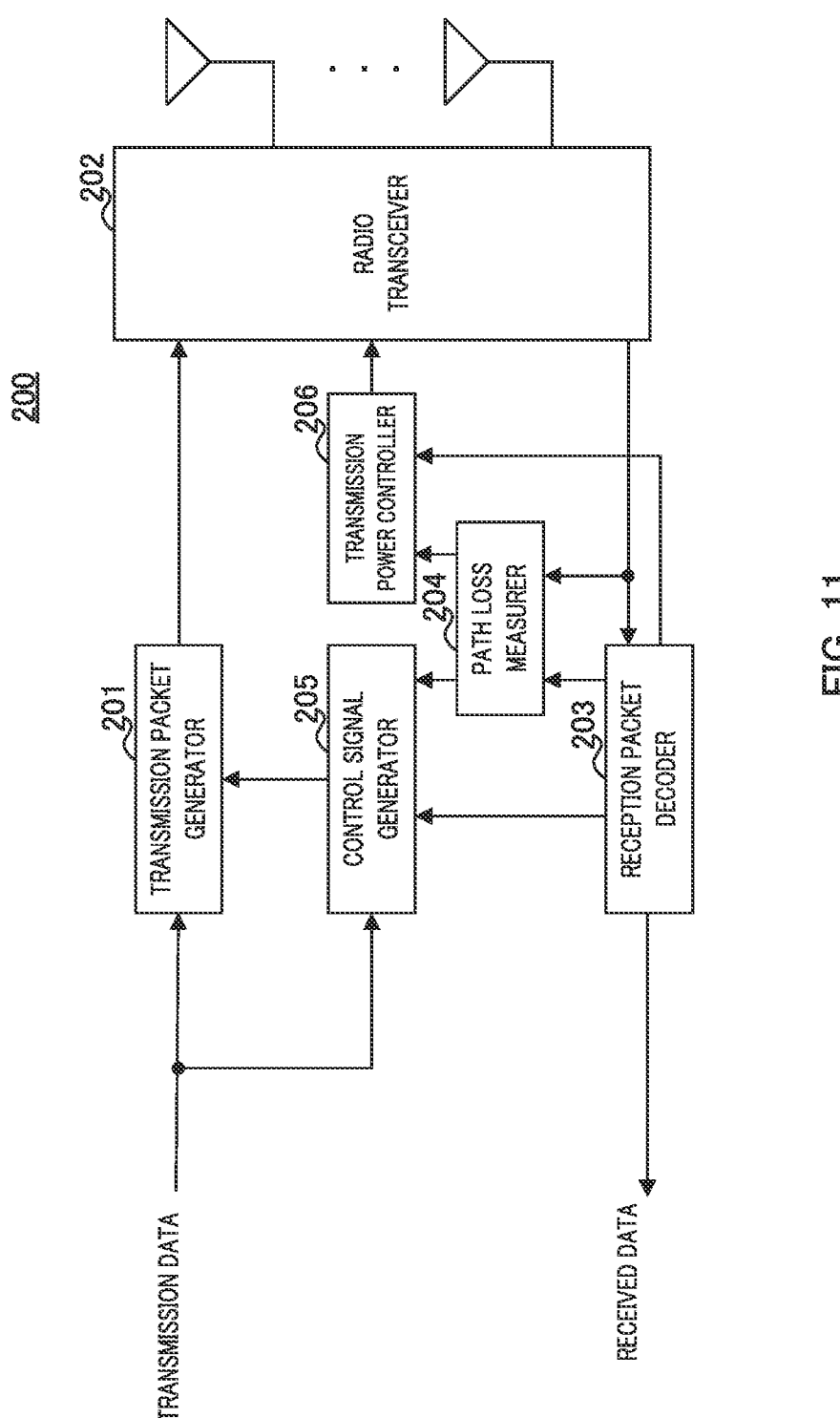
FIG. 11 is a block diagram illustrating an exemplary configuration of the STA.

FIG. 11 is a block diagram illustrating an exemplary configuration of an STA according to the present embodiment. STA 200 illustrated in FIG. 11 includes transmission packet generator 201, radio transceiver 202, reception packet decoder 203, path loss measurer 204, control signal generator 205, and transmission power controller 206.

For example, controller 11 illustrated in FIG. 9 may include at least one of transmission packet generator 201, reception packet decoder 203, path loss measurer 204, control signal generator 205, and/or transmission power controller 206 illustrated in FIG. 11. Further, for example, transmitter 12 illustrated in FIG. 9 may include radio transceiver 202 illustrated in FIG. 11.

Transmission packet generator 201, for example, generates a transmission packet from transmission data received from a processor (not illustrated) in a higher layer and data (e.g., control information) generated by control signal generator 205, and outputs the generated packet to radio transceiver 202.

Radio transceiver 202 converts the transmission packet input from transmission packet generator 201 into a radio transmission signal, and transmits the radio transmission signal via an antenna.

Radio transceiver 202 receives a radio reception signal, converts the radio reception signal into a reception packet, and outputs the reception packet to reception packet decoder 203 and path loss measurer 204.

Reception packet decoder 203 decodes the reception packet and outputs the received data input from radio transceiver 202 to a processor (not illustrated) in a higher layer. Alternatively, reception packet decoder 203 decodes the reception packet and outputs control information to path loss measurer 204, control signal generator 205, and transmission power controller 206.

For example, path loss measurer 204 measures path loss between AP 100 and STA 200 based on the reception power measurement value of the reception packet input from radio transceiver 202 and the information on the transmission power of AP 100 included in the control information input from reception packet decoder 203, and outputs the information on the path loss to control signal generator 205 and transmission power controller 206.

Control signal generator 205 generates control information based on at least one of transmission data, control information input from reception packet decoder 203, information on the path loss input from path loss measurer 204, and/or the internal state, and outputs the generated control information to transmission packet generator 201.

Transmission power controller 206 controls uplink transmission power in radio transceiver 202 based on the information on the transmission power included in the control information input from reception packet decoder 203 and the information on the path loss input from path loss measurer 204.

[Exemplary Operation of UL-UL Communication]

Figure 12:
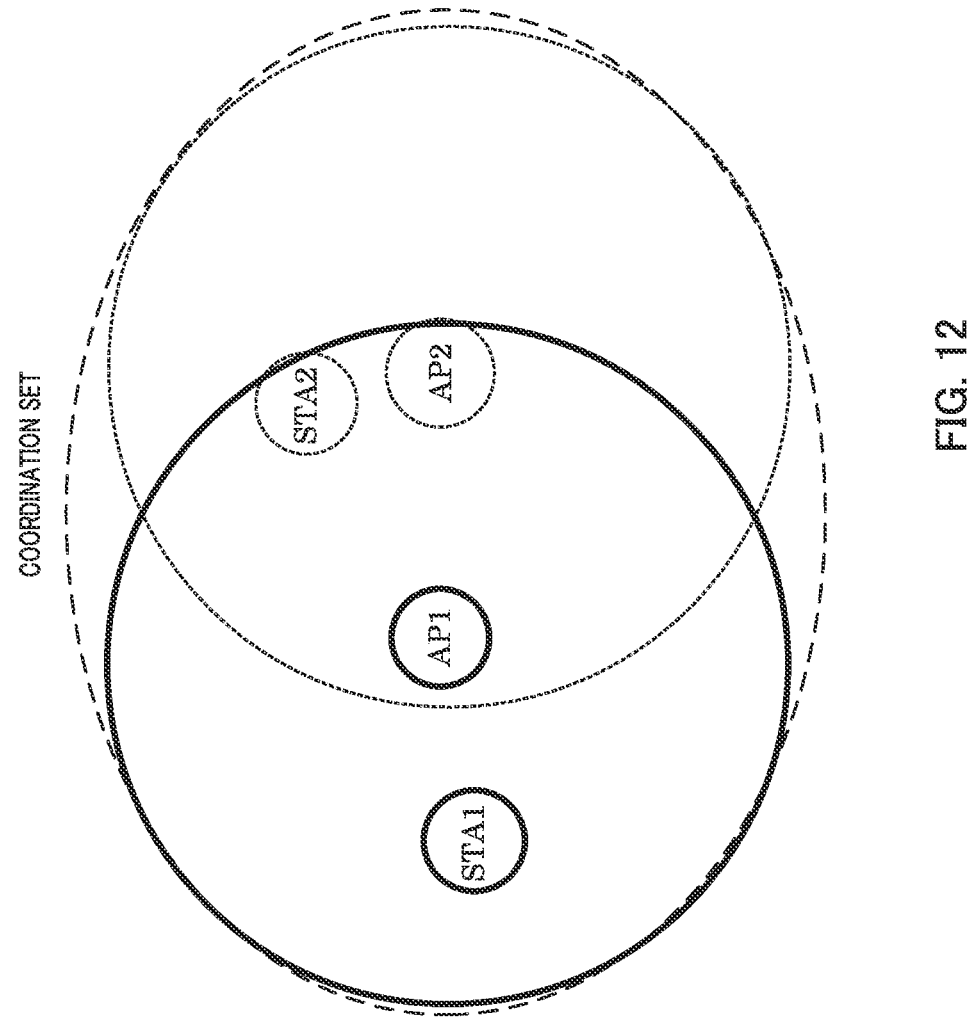
FIG. 12 illustrates an exemplary placement of APs and STAs.

Hereinafter, an example of coordination in UL-UL communication by AP 100 and STA 200 will be described. FIG. 12 illustrates exemplary UL-UL communication that perform coordination based on a C-SR scheme.

FIG. 12 illustrates a set (coordination set) including, for example, AP1, AP2, STA1, and STA2. STA1 is present in the coverage area of AP1 and associates with AP1. STA2 is present in the coverage area of AP2 and associates with AP2. In other words, in FIG. 12, the associated AP of STA1 is AP1 and the associated AP of STA2 is AP2.

In FIG. 12, for example, UL communication from STA1 to AP1 and UL communication from STA2 to AP2 are coordinated by a C-SR scheme. In FIG. 12, for example, AP1 is an AP (e.g., a Master AP or a Sharing AP) that is placed in a coordination set and controls the coordination set (or coordinated communication). AP2 is an AP (e.g., a Slave AP or a Shared AP) that is placed in the coordination set and controlled by the Master AP.

Further, in FIG. 12, for example, as the transmission power of STA2 is set to be lower (in other words, limited), the effect of interference from STA2 with AP1 may be reduced. Furthermore, in FIG. 12, for example, AP2 is positioned where it is less susceptible to interference from STA1.

In FIG. 12, STA1 is positioned where it is less likely to receive a packet from AP2 while STA1 can receive a packet from AP1, for example. In this case, the reception power of the packet from AP2 tends to be low in STA1.

On the other hand, in FIG. 12, STA2 is positioned where STA2 can received a packet from both AP1 and AP2, for example. In this case, the reception power of the packet from AP1 tends to be high in STA2.

For example, UL-UL communication may be performed in the coordination set after the initialization of the coordination set illustrated in FIG. 12, the association of STA1 with AP1, and the association of STA2 with AP2.

Figure 13:
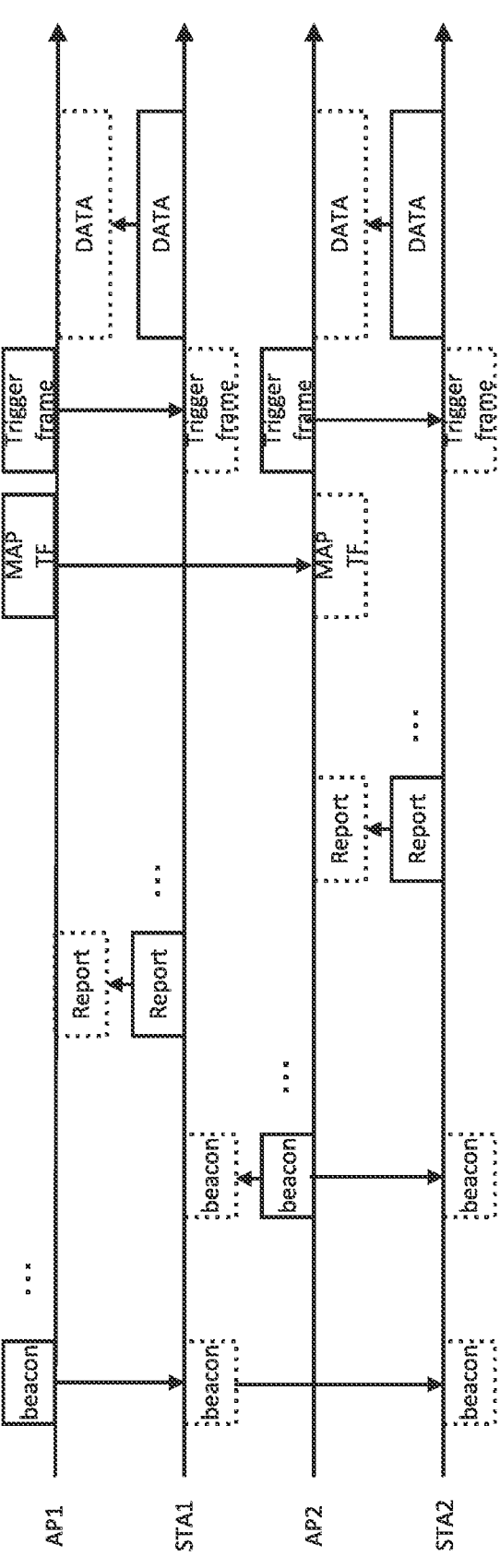
FIG. 13 is a sequence diagram illustrating exemplary UL-UL communication according to Embodiment 1.

FIG. 13 is a sequence diagram illustrating an exemplary UL-UL communication in the coordination set illustrated in FIG. 12.

In FIG. 13, AP1 and AP2 transmit beacons, for example. The beacons may be transmitted in a certain cycle, for example. Further, the beacons may, for example, include information on transmission power values of AP1 and AP2, respectively. After receiving the beacons from respective APs, STA1 and STA2 may measure the path loss between STA-AP based on the transmission power of the APs included in the beacons and the reception power measured using the beacons.

STA1 notifies AP1, which is the associated AP, of a Report packet including the information on the measured path loss, for example. Similarly, STA2 notifies AP2, which is the associated AP, of a Report packet including the information on the measured path loss, for example. STA2 may notify AP2 of the path loss between STA2-AP1 and the path loss between STA2-AP2 by a Report packet, for example.

AP1, for example, specifies a frequency band that AP2 will receive to AP2 by a Multi-AP Trigger frame (MAP TF) indicating the initiation of coordinated transmission.

AP2 calculates a transmission power value (UL transmission power) of STA2 based on the path loss between STA2-AP1 and the path loss between STA2-AP2 included in the Report packet. AP2, for example, notifies STA2 of a Trigger frame including the information on the calculated transmission-power value of STA2.

STA2, for example, transmits a DATA packet based on the transmission power value specified by a Trigger frame from AP2.

As described above, in FIG. 13, the transmission power value of STA2 is calculated by AP2, which is the associated AP of STA2. Further, for example, the path loss value used for the calculation of the transmission power value of STA2 is measured based on the beacon that STA2 receives from each AP100 (e.g., AP1 and AP2), and is transmitted to AP2, which is the associated AP of STA2. In other words, the path loss value measured by STA2 need not be transmitted to AP1, which is not an associated AP of STA2.

Thus, for example, AP2, which is a Shared AP in coordinated communication, need not notify AP1, which is a Sharing AP, of the path loss of STA2 (e.g., path loss between STA2-AP1 and path loss between STA2-AP2).

Therefore, according to the present embodiment, the information amount of the communication between APs can be reduced in the transmission power control of UL communication, so that the efficiency of the transmission power control in the coordinated communication can be enhanced.

Note that, in FIG. 13, AP1 may calculate the transmission power value (UL transmission power value) of STA1 based on the information on the path loss (e.g., path loss between STA1-AP1 and path loss between STA1-AP2) included in a Report packet from STA1, and notify STA1 of a Trigger frame including the information on the calculated transmission power value of STA2. STA1 may, for example, transmit a DATA packet based on the transmission power value specified by the Trigger frame from AP1.

Further, STA 200 may voluntarily transmit a Report packet. For example, STA 200 may transmit a Report packet based on the most recent beacon. Alternatively, STA 200 may respond (e.g., transmit a Report packet) to a Report packet request from AP 100, for example. Furthermore, when STA 200 voluntarily transmits a Report packet, STA 200 may, for example, transmit a set of an identifier of AP 100 (e.g., AP-ID) and a path loss value corresponding to AP100, and may transmit the path loss value between STA 100 and AP 100 that corresponds to the AP-ID specified in the Report packet request from AP100 in the Report packet.

Further, in the above-described embodiment, STA 200 measures the path loss based on the beacons, but the signal used for measuring the path loss is not limited to the beacon, and may be a Null Data Packet (NDP), for example.

Further, in the above example, the path loss is notified to AP 100 by a Report packet, but the information notified to AP 100 is not limited to the path loss. For example, STA 200 may notify AP 100 of the reception power, and AP 100 may calculate path loss of STA 200 based on the notified reception power.

Further, for example, when STA 200 receives no beacon from each AP 100, STA 200 may configure the path loss between AP 100 and STA 200 as a maximum value of the path loss or a minimum value of the reception power, and may notify the associated AP.

Furthermore, in FIG. 13, the case has been described in which the transmission power value is notified from AP2 to STA2 by the Trigger frame, but the information notified by the Trigger frame is not limited to the transmission power value. For example, AP2 may notify (or specify) STA2 of a value (hereinafter, referred to as, e.g., Expected receive power) obtained by subtracting the path loss between STA2-AP2 from the calculated transmission power value. In this case, STA2 can determine transmission power, treating the Expected receive power in the same manner as UL Target RSSI in FIG. 6. For example, STA2 can calculate the path loss between AP2-STA2 based on the transmission power information (AP TX Power in FIG. 6) of AP2 included in the Trigger frame transmitted from AP2 and the reception power of the Trigger frame in STA2, and can determine the transmission power from the calculated path loss and the Expected receive power. Therefore, it is preferred that a value of the Expected receive power be configured in a UL Target RSSI field when the Expected receive power is notified by the format of the Trigger frame illustrated in FIG. 6. Alternatively, when the Expected receive power is used for coordinated communication, the UL Target RSSI field may be transformed, for example, into a UL Expected Receive Power field, and to indicate the Expected receive power. Thus, the Trigger frame of the format illustrated in FIG. 6 can be used for both coordinated communication and communication different from the coordinated communication, without adding a field.

Further, for example, in FIG. 13, AP1 may specify transmission power of STA1 with a preset (or restricted) value.

Further, the Sharing AP (e.g., AP1 in FIG. 13) may, for example, notify the Shared AP (e.g., AP2 in FIG. 13) of acceptable interference power (also referred to as Acceptable Maximum Interference Level) in the MAP TF, for example. The Shared AP may, for example, configure the transmission power of STA 200 based on the notified acceptable interference power. Transmission power control using acceptable interference power allows the Shared AP to configure transmission power of STA 200 associating with the Shared AP while considering the interference with the Sharing AP, so that the accuracy of the transmission power control can be enhanced.

Figures 14, 15, 16:
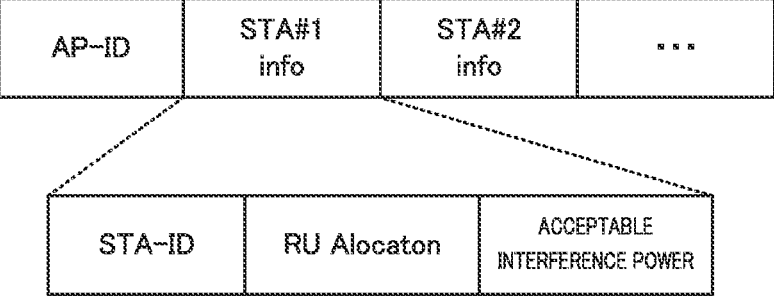
FIG. 14 illustrates an exemplary format of a Multi-AP (MAP) Trigger frame.
FIG. 15 illustrates another exemplary format of the Multi-AP (MAP) Trigger frame.
FIG. 16 illustrates still another exemplary format of the Multi-AP (MAP) Trigger frame.

Note that the acceptable interference power may be notified in the Common info field of the MAPTF. FIG. 14 illustrates an exemplary format in which a field of acceptable interference power is added to the Common info field of the MAP TF. In FIG. 14, the Sharing AP notifies the Shared AP of one value of acceptable interference power in the MAP TF. Thus, for example, in a case where the Trigger frame following the MAP TF specifies configurations for a plurality of STAs 200, the acceptable interference power specified in the MAP TF may be configured as one value (e.g., a minimum value) among the values of the acceptable interference power for STAs 200.

In addition, for example, the acceptable interference power may be notified in a User info field of the MAP TF. For example, the acceptable interference power may be individually specified for AP 100, may be individually specified for a frequency band, or may be individually specified for STA 200. FIG. 15 illustrates an exemplary format in which the acceptable interference power is individually specified for AP 100 or a frequency band. For example, "AP-ID" illustrated in FIG. 15 is an identifier for specifying AP 100. AP-ID may be included in, for example, AID12, which is an identifier of STA 200 illustrated in FIG. 6, or may be used instead of AID12. Further, FIG. 16 illustrates an exemplary format in which the acceptable interference power is individually specified for STA 200. As illustrated in FIG. 16, information on the acceptable interference power may be included in a STA info field (information field individual for STA) in the User info field.

Embodiment 2

In the exemplary configuration of the base station and the terminal according to the present embodiment, some functions may be different from those of Embodiment 1, and other functions may be the same as those of Embodiment 1.

In Embodiment 1, the example has been described in which AP 100 determines the transmission power of STA 200 based on the path loss measured in STA 200, for example. In the present embodiment, a case where STA 200 determines the transmission power based on the path loss will be described.

Note that, in the following, similarly to Embodiment 1, exemplary UL-UL communication in which AP 100 (e.g., AP1 and AP2) and STA 200 (e.g., STA1 and STA2) cooperate with each other based on a C-SR scheme will be described as illustrated in FIG. 12.

Figure 17:
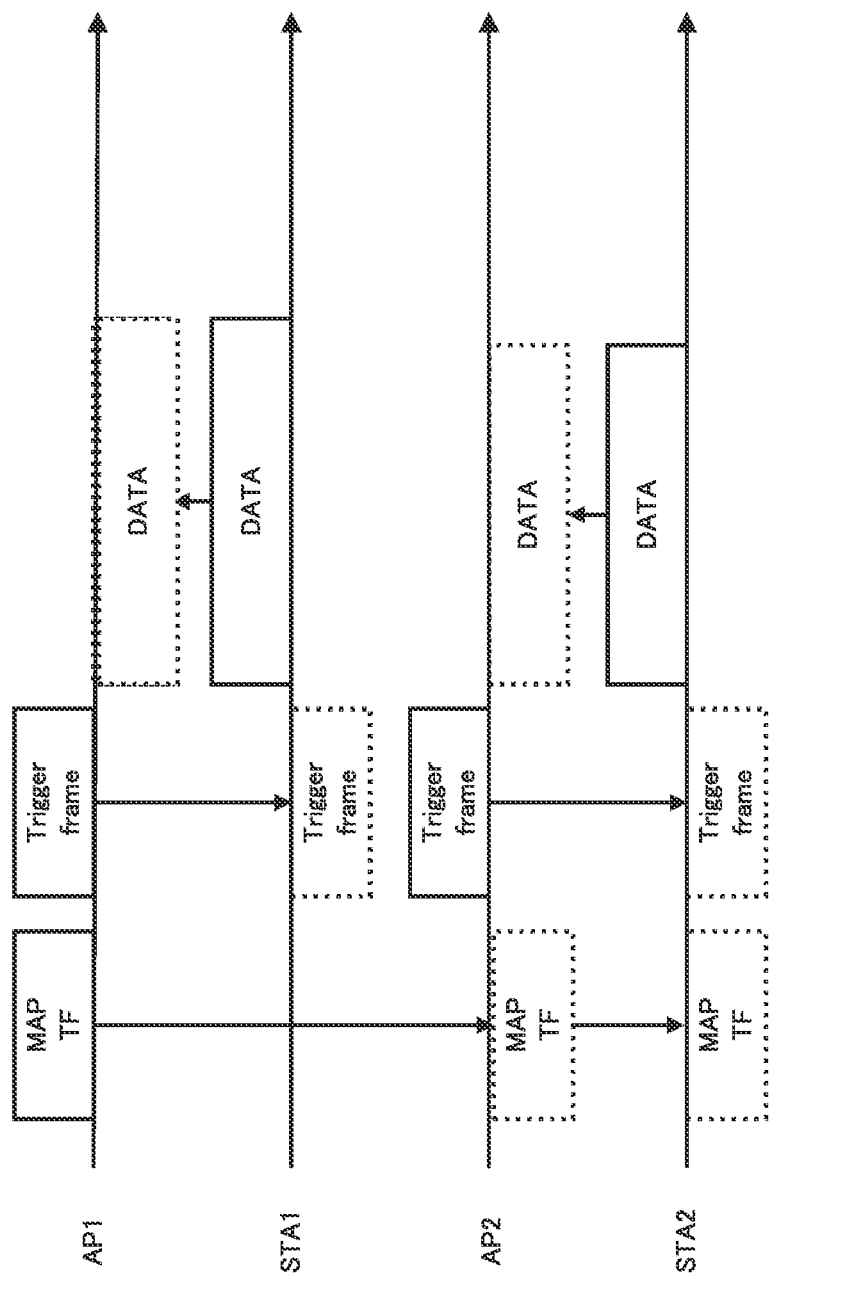
FIG. 17 is a sequential diagram illustrating exemplary UL-UL communication according to Embodiment 2.

FIG. 17 is a sequence diagram illustrating an exemplary UL-UL communication in the coordination set illustrated in FIG. 12.

In FIG. 17, AP1, which is a Sharing AP, specifies a frequency band that AP2 will receive to AP2, which is a Shared AP, by a MAP TF, for example. The MAP TF may include, for example, UL spatial reuse information illustrated in FIG. 5, or the acceptable interference power described in Embodiment 1. Note that, in FIG. 17, STA1 and STA2 can also receive the MAP TF.

AP1 and AP2 transmit, for example, Trigger frames including information on transmission power control to STA1 and STA2, respectively. The information on the transmission power control may include, for example, APTX Power (information indicating a transmission power value from AP to STA) illustrated in FIG. 5 and UL Target RSSI (information on a target reception signal strength of AP 100 in the uplink) illustrated in FIG. 6.

When STA2 receives a MAP TF (e.g., a signal from AP different from the associated AP) that indicates the initiation of coordinated communication from AP1, STA2 measures path loss using the MAP TF, and calculate a transmission power candidate (hereinafter, referred to as "TxPower-OBSS") based on the measured path loss. For example, STA2 may calculate the transmission power candidate based on the MAP TF with the same processing as PSR-based spatial reuse illustrated in FIG. 8. For example, STA2 may calculate the transmission power candidate of the uplink, TxPowerOBSS, based on the value specified by UL spatial reuse included in the MAP TF and the path loss measured using the MAP TF.

Further, when STA2 receives a Trigger frame (e.g., Trigger frame from the associated AP) indicating uplink transmission from AP2, STA2 may calculate a transmission power candidate (hereinafter, referred to as "TxPowerBSS") based on the information (e.g., including the above-described APTX Power and UL Target RSSI) on the transmission power control included in the Trigger frame and the reception power (e.g., referred to as "RxPower") measured using the Trigger frame. STA2 may, for example, calculate the transmission power candidate, TxPowerBSS, in accordance with the following Equation 1. For example, (AP TX power–RxPower) in Equation 1 corresponds to the path loss between STA2-AP2.

$$\text{TxPowerBSS}=(\text{APTX Power–RxPower})+\text{UL Target RSSI} \qquad \text{(Equation1)}$$

Then, STA2 may determine the transmission power (hereinafter, referred to as "TxPow") of the uplink signal (e.g., DATA packet) based on the plurality of transmission power candidates, TxPowerOBSS and TxPowerBSS, in accordance with the following Equation 2.

$$\text{TxPow}=\min(\text{TxPowerOBSS},\text{TxPowerBSS}) \qquad \text{(Equation 2)}$$

As described above, STA 200 determines the uplink transmission power based on the plurality of signals (e.g., MAP TF and Trigger frame) received from the plurality of transmission sources (e.g., AP1 and AP2) that perform coordinated communication of the uplink, and performs uplink transmission with the determined transmission power.

For example, in FIG. 17, a transmission power value of STA2 is calculated by STA2. Further, a path loss value used for the calculation of the transmission power value of STA2 is measured based on trigger frames transmitted from a plurality of APs 100 (e.g., AP1 and AP2) and received by STA2. Therefore, the path loss value measured by STA2 need not be transmitted to AP 100 (e.g., AP1 and AP2), for example.

Thus, for example, in FIG. 17, AP2, which is a Shared AP (e.g., AP 100 different from AP1 that controls the coordinated communication), need not notify AP1, which is a Sharing AP, of the path loss of STA2 (e.g., the path loss between STA2-AP1 and the path loss between STA2-AP2). Further, STA2 need not notify AP2 of the path loss of STA2.

Therefore, according to the present embodiment, the information amount of the communication between APs can be reduced in the transmission power control of UL communication, so that the efficiency of the transmission power control in the coordinated communication can be enhanced.

Further, in the present embodiment, for example, as illustrated in FIG. 17, STA 200 configures transmission power using the path loss measured based on the packet (e.g., the MAP TF from AP1 and the Trigger frame from AP2 in FIG. 17) received at a timing closer to the transmission timing of the DATA packet. This configuration of transmission power shortens the interval from the path loss measurement to the packet transmission, and thus makes it easier to follow the change of the path loss due to the movement of the shielding object or STA 200, so that the accuracy of the transmission power control can be enhanced.

Further, in this case, TxPowerBSS is a transmission power value configured based on the path loss between STA2 and AP2, which is the associated AP of STA2, and the parameter notified by the Trigger frame from AP2. In other words, TxPowerBSS is a transmission power value (e.g., a desired transmission power value) expected for communication between STA2-AP2. On the other hand, TxPower-OBSS is, for example, a transmission power value configured based on UL spatial reuse included in the MAP TF from AP1 different from the associated AP of STA2. For example, the parameter specified by UL spatial reuse may include a value relating to acceptable interference power. In this case, TxPowerOBSS is, for example, transmission power acceptable for UL transmissions in STA2. In other words, a signal transmitted by STA2 with transmission power that exceeds TxPowerOBSS may interfere with AP1.

Thus, according to Equation 2, STA2 can, for example, configure the uplink transmission power, configuring TxPowerOBSS as an upper limit, so that the accuracy of the transmission power control in the uplink can be enhanced. Accordingly, STA 200 positioned where packets from a plurality of APs 100 can be received can appropriately perform uplink transmission power control that reduces the interference with a plurality of APs 100 performing coordinated communication.

Note that, in FIG. 17, when STA2 receives no MAP TF, STA2 may configure TxPowerBSS as the transmission power of a DATA packet, for example. When STA2 receives no MAPTF, it is assumed that the path loss based on the MAPTF, for example, the path loss between STA2-AP1, is larger than the path loss when STA2 receives the MAP TF; therefore, it is assumed that the effect of the interference of the uplink transmission from STA2 with AP1 is small even though the transmission power of STA2 is set to TxPowerBSS. As described above, STA 200 positioned where a packet from some (e.g., associated AP) of APs 100 can be received among a plurality of APs 100 performing coordinated communication can appropriately perform uplink transmission power control in consideration of AP 100 performing uplink communication, based on the packet from some of APs 100.

Further, for example, in FIG. 12, STA1 is less likely to receive a packet of AP2 while STA1 can receive a packet of AP1. Thus, in FIG. 17, STA1 may configure transmission power (e.g., the same value as TxPowerBSS) based on the Trigger frame from AP1.

Furthermore, in the present embodiment, STA2 calculates TxPowerOBSS when receiving the MAP TF from AP1 (e.g., OBSS). In other words, STA2 need not calculate TxPower-OBSS when STA2 receives no MAP TF from AP1 (e.g., OBSS). Then, for example, STA 200 may receive acceptable interference power (also referred to as Acceptable Maximum Interference Level) notified in the MAP TF from the Sharing AP (e.g., AP1 in FIG. 17). The information on the acceptable interference power may be included in a Common info field of the MAP TF (or the Trigger frame) as illustrated in FIG.

14, may be included in a User info field of the MAP TF (or the Trigger frame) as illustrated in FIG. 15, or may be included in a STA info field in the User info field as illustrated in FIG. 16.

Due to the notification of the acceptable interference power, when STA2 receives the MAP TF, STA2 may configure transmission power of STA2 based on the acceptable interference power included in the MAP TF, for example. The transmission power control using the acceptable interference power allows the Shared AP to configure transmission power of STA 200 associating with the Shared AP, considering the interference with the Sharing AP, so that the accuracy of the transmission power control can be enhanced.

Note that, in STA 200, the method for calculating a transmission power candidate, TxPowerBSS, based on the Trigger frame from the associated AP is not limited to the method based on Equation 1, for example, and may be another method. Further, in STA 200, the method for calculating a transmission power candidate. TxPowerOBSS, based on the Trigger frame (e.g., MAP TF) from an AP different from the associated AP is not limited to the method based on PSR-based spatial reuse, for example, and may be another method. For example, methods for calculating TxPowerBSS and TxPowerOBSS may be the same as or different from each other.

Embodiment 3

In the exemplary configuration of the base station and the terminal according to the present embodiment, some functions may be different from those of Embodiment 1, and other functions may be the same as those of Embodiment 1.

In Embodiment 2, the coordinated communication by two APs 100 has been described, but the number of APs 100 performing coordinated communication may be three or more. In the present embodiment, a case where the number of APs 100 is three will be described.

Figure 18:
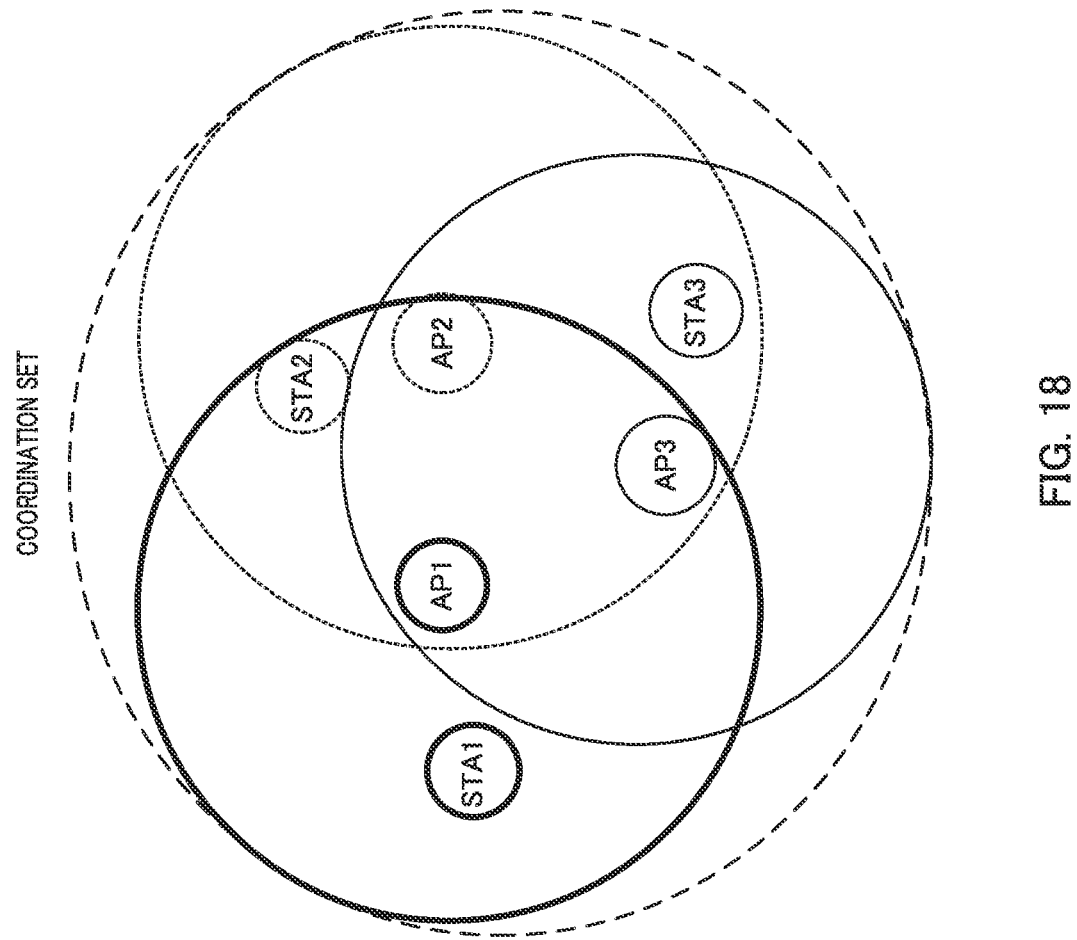
FIG. 18 illustrates an exemplary placement of APs and STAs.

FIG. 18 illustrates exemplary UL-UL communication that cooperates based on a C-SR scheme.

FIG. 18 illustrates a set (coordination set) including, for example, AP1, AP2, AP3, STA1, STA2, and STA3. STA1 is present in the coverage area of AP1 and associates with AP1. STA2 is present in the coverage area of AP2 and associates with AP2. STA3 is present in the coverage area of AP3 and associates with AP3. In other words, in FIG. 18, the associated AP of STA1 is AP1, the associated AP of STA2 is AP2, and the associated AP of STA3 is AP3.

In FIG. 18, UL communication from STA 1 to AP1, UL communication from STA2 to AP2, and UL communication from STA3 to AP3 are coordinated by a C-SR scheme. In FIG. 18, AP1 is an AP (e.g., referred to as a Master AP or a Sharing AP) that is placed within the coordination set and controls the coordination set (or coordinated communication), for example. AP2 and AP3 are APs (e.g., each referred to as a Slave AP or a Shared AP) that are placed within the coordination set and controlled by the Master AP. In other words, FIG. 18 illustrates an exemplary coordinated transmission including a plurality of Shared APs (or Slave APs).

Further, in FIG. 18, for example, as the transmission power of STA2 and STA3 is set to be lower (in other words, limited), the effect of interference from STA2 and STA3 with AP1 may be reduced. Furthermore, in FIG. 18, for example, as the transmission power of STA1 and STA3 is set to be lower (in other words, limited), the effect of interference from STA1 and STA3 with AP2 may be reduced. In addition, in FIG. 18, for example, AP3 is positioned where it is less susceptible to the interference from STA1 and STA2.

In FIG. 18, STA 1 is positioned where it is less likely to receive a packet from AP2 or AP3 while STA1 can receive a packet from AP1, for example. In this case, the reception power of packets from AP2 and AP3 tends to be low in STA1.

On the other hand, in FIG. 18, STA2 is positioned where packets from both AP1 and AP2 can be received, for example. In this case, the reception power of packets from AP1 tends to be high in STA2. Further, in FIG. 18, STA3 is positioned where packets from AP1, AP2 and AP3 can be received. In this case, the reception power of packets from AP1 and AP2 tends to be high in STA3.

For example, UL-UL communication may be performed in the coordination set after the initialization of the coordination set illustrated in FIG. 18, the association of STA 1 with AP1, the association of STA2 with AP2, and the association of STA3 with AP3.

Figure 19:
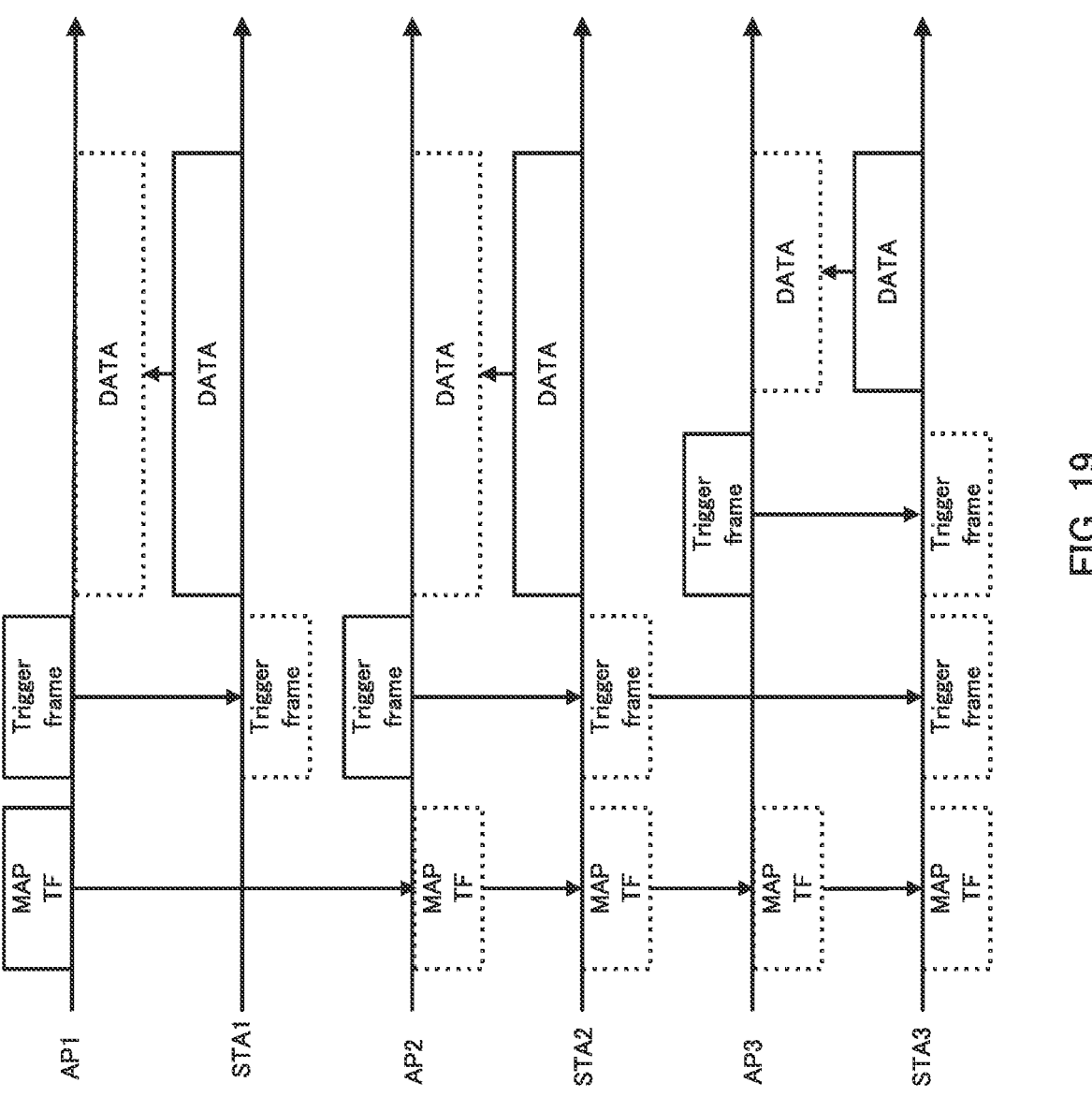
FIG. 19 is a sequential diagram illustrating exemplary UL-UL communication according to Embodiment 3.

FIG. 19 is a sequential diagram illustrating exemplary UL-UL communication in the coordination set illustrated in FIG. 18.

In FIG. 19, similarly to Embodiment 2, AP1, which is a Sharing AP, specifies a frequency band that each of AP2 and AP3 receive to AP2 and AP3, which are Shared APs, by a MAP TF. The MAP TF may include, for example, UL spatial reuse information illustrated in FIG. 5 or the acceptable interference power described in Embodiment 1. Note that, in FIG. 19, STA1, STA2, and STA3 can also receive the MAP TF, for example.

Similarly to Embodiment 2, AP1 and AP2 transmit, for example, Trigger frames including information on the transmission power control to STA1 and STA2, respectively. The information on the transmission power control may include, for example, AP TX Power (information indicating a transmission power value from AP to STA) illustrated in FIG. 5 and UL Target RSSI (information on a target reception signal strength of AP 100 in the uplink) illustrated in FIG. 6, similarly to Embodiment 2.

In the present embodiment, STA 1 and STA2 may configure the transmission power by the same operation as in Embodiment 2.

Further, in FIG. 19, AP3 transmits a Trigger frame to STA3 at a transmission timing different from the transmission timing of a Trigger frame of AP2, for example. For example, AP3 may transmit the Trigger frame after a certain space (e.g., Short Inter Frame Space (SIFS)) from the Trigger frame of AP2. Alternatively, for example, the packet length (e.g., referred to as a Trigger Length) of the Trigger frame of AP2 may be notified by the MAP TF, and AP3 may transmit the Trigger frame after (SIFS+Trigger Length+SIFS) from the MAP TF.

As described above, the time-domain resources of Trigger frames transmitted from a plurality of Shared APs may be different from each other.

For example, when STA3 receives a MAP TF (e.g., a signal from an AP different from the associated AP) indicating the initiation of the coordinated communication from AP1, STA3 calculates a transmission power candidate (hereinafter, referred to as "TxPowerOBSS1") based on the MAP TF. STA3 may measure path loss using the MAP TF, and calculate TxPowerOBSS1 based on the measured path loss and the value specified by UL spatial reuse, for example. STA3 may calculate the transmission power candidate based on the MAPTF with the same processing as PSR-based spatial reuse illustrated in FIG. 8, for example.

Similarly, when STA3 receives a Trigger frame (e.g., a signal form an AP different from the associated AP) from AP2, STA3 calculates a transmission power candidate (hereinafter, referred to as "TxPowerOBSS2") based on the Trigger frame. STA3 may measure path loss using the Trigger frame, and calculate TxPowerOBSS2 based on the measured path loss and the value specified by UL spatial reuse, for example. STA3 may calculate the transmission power candidate based on the Trigger frame from AP2 different from the associated AP with the same processing as PSR-based spatial reuse illustrated in FIG. 8, for example.

Further, when STA3 receives a Trigger frame (e.g., a Trigger frame from the associated AP) indicating uplink transmission from AP3, STA3 calculates a transmission power candidate (hereinafter, referred to as "TxPowerBSS") based on the Trigger frame. STA3 may calculate TxPowerBSS based on, for example, information (e.g., including AP TX Power and UL Target RSSI) on the transmission power control included in the Trigger frame and the reception power (e.g., referred to as "RxPower") measured using the Trigger frame. STA3 may calculate the transmission power candidate, TxPowerBSS, in accordance with Equation 1 described above, for example.

Then, STA3 may determine the transmission power (hereinafter, referred to as "TxPow") of the uplink signal (e.g., DATA packet) based on the plurality of transmission power candidates, TxPowerOBSS1, TxPowerOBSS2, and TxPowerBSS, in accordance with the following Equation 3.

$$TxPow=min(TxPowerOBSS1,TxPowerOBSS2,TxPowerBSS) \quad \text{(Equation 3)}$$

As described above, STA 200 determines the uplink transmission power based on the plurality of signals (e.g., MAP TF and Trigger frame) received from the plurality of transmission sources (e.g., AP1, AP2, and AP3) that perform coordinated communication of the uplink, and performs uplink transmission with the determined transmission power.

For example, in FIG. 19, a transmission power value of STA3 may be calculated by STA3. Further, a path loss value used for the calculation of the transmission power value of STA3 is measured based on trigger frames transmitted from a plurality of APs 100 (e.g., AP1, AP2, and AP3) and received by STA3. Therefore, the path loss value measured by STA3 need not be transmitted to AP 100 (e.g., AP1, AP2, and AP3), for example.

Thus, for example, in FIG. 19, AP2 and AP3, which are Shared APs (e.g., APs 100 different from AP that controls the coordinated communication) need not notify AP1, which is a Sharing AP, of the path loss of STA2 and STA3. In addition, STA2 and STA3 need not notify AP2 and AP3 of the path loss of STA2 and STA3.

Therefore, according to the present embodiment, the information amount of the communication between APs can be reduced in the transmission power control of UL communication, so that the efficiency of the transmission power control in the coordinated communication can be enhanced even when the number of APs is three or more.

Note that, for example, when STA3 receives no Trigger frame of AP2, STA3 may perform transmission power control based on TxPowerOBSS1 and TxPowerBSS (e.g., the same operation as STA2 of Embodiment 2 illustrated in FIG. 17). Further, for example, when STA3 receives no MAP TF of AP1, STA3 may perform transmission power control based on TxPowerOBSS2 and TxPowerBSS. Furthermore, for example, in FIG. 19, when STA3 receives no MAP TF from AP1 and Trigger frame from AP2, STA3 may configure TxPowerBSS as transmission power of DATA packet.

Further, for example, the order of transmitting Trigger frames in Shared APs may be an order specified by the User info field of the MAP TF. For example, when the User info field specifies AP2 and AP3 in this order, the transmission order of Trigger frames illustrated in FIG. 19 may be configured.

Further, in FIG. 19, the case where Trigger frames of AP2 and AP3 are transmitted at different timings (in other words, resources of different time domains) has been described, but Trigger frames of AP2 and AP3 may be transmitted in different resources in a certain domain. For example, Trigger frames of AP2 and AP3 may be transmitted in different frequency bands (resources in different frequency domains). In this case, time resources (or timing) in which the Trigger frames of AP2 and AP3 are transmitted may be the same with or different from each other. Accordingly, STA3 can measure the path loss between STA3-AP2 based on the Trigger frame from AP2, for example.

Further, in the example illustrated in FIG. 19, the case where the number of Shared APs is two (AP2 and AP3) has been described, but the number of Shared APs may be three or more. In this case, resources in which Trigger frames of three or more Shared APs are transmitted may be different from each other in at least one of a time domain and/or a frequency domain, for example. Accordingly, STA 200 can measure the path loss between Shared APs based on Trigger frames from a plurality of Shared APs.

Further, for example, in FIG. 19, the allocated frequency band for the Trigger frame of AP3 may be different from the allocated frequency band for DATA of STA1 and STA2. This configuration of frequency bands allows AP3 to transmit a Trigger frame while reducing interference with DATA even when the transmission timing of the Trigger frame of AP3 and the transmission timing of DATA from STA1 and STA2 collide (overlap) with each other as illustrated in FIG. 19.

Further, for example, in FIG. 19, the transmission power of the Trigger frame of AP3 may be controlled based on the path loss between AP1-AP3 measured using the MAP TF and the path loss between AP2-AP3 measured using the Trigger frame transmitted by AP2. This transmission power control enables transmission power control that reduces interference of the Trigger frame of AP3 with DATA reception of AP1 and AP2.

Further, in the present embodiment, STA3 calculates TxPowerOBSS1 when receiving a MAP TF from AP1 (e.g., OBSS). In other words, STA3 need not calculate TxPowerOBSS1 when STA3 receives no MAP TF from AP1 (e.g., OBSS). Thus, for example, STA 200 may receive acceptable interference power (also referred to as Acceptable Maximum Interference Level) notified by the MAP TF from the Sharing AP (e.g., AP1 in FIG. 19). The information on the acceptable interference power may be included in a Common info field of the MAP TF (or the Trigger frame) as illustrated in FIG. 14, may be included in a User info field of the MAP TF (or the Trigger frame) as illustrated in FIG. 15, or may be included in an STA info field in the User info field as illustrated in FIG. 16.

The embodiments of the present disclosure have been described above.

(Variation 1)

In Embodiment 2 and Embodiment 3. STA 200 controls uplink transmission power based on signals from a plurality of APs 100. In Variation 1, for example, AP 100 may indicate the validation and invalidation of the operation of transmission power control based on a plurality of signals.

For example, Trigger frame may notify STA 200 of the validation and invalidation of the operation of transmission power control based on a plurality of signals (e.g., referred to as "TX Power Select"). For example, Tx Power Select may be indicated in Reserved (B63) of Common info field illustrated in FIG. 5.

STA 200 may, decide whether to determine transmission power based on a plurality of signals, based on TX Power Select included in the Trigger frame. For example, when TX Power Select=0, STA 200 may perform transmission power control based on the Trigger frame of the associated AP (transmission power control based on a plurality of signals: invalid). On the other hand, when TX Power Select=1. STA 200 may, for example, perform transmission power control described in Embodiment 2 or Embodiment 3 (transmission power control based on a plurality of signals: valid).

Further, specifying TX Power Select may be based on path loss, for example. For example, in Embodiment 1, when the path loss between STA2-AP1 is sufficiently larger than the path loss between STA2-AP2 (e.g., when the difference is equal to or larger than a threshold value), TX Power Select=0 (invalid) may be configured.

Further, STA 200 may also determine the validation and invalidation of transmission power control based on a plurality of signals, based on a received packet type (e.g., Trigger Type of the Common info field illustrated in FIG. 5) instead of based on TX Power Select. For example, when the Trigger Type receives a packet of a MAP TF from an AP different from the associated AP, STA 200 may configure transmission power control based on the plurality of signals as valid in a TXOP period specified in the preamble of the UL Length or the MAP TF illustrated in FIG. 5. Accordingly, the operation period of the transmission power control based on the plurality of signals can be configured (or limited).

(Variation 2)

Figures 20, 21:
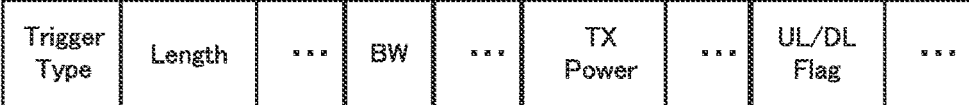
FIG. 20 illustrates an exemplary Common info field of the MAP Trigger frame.
FIG. 21 illustrates an exemplary User info field of the MAP Trigger frame.

In Embodiment 1, Embodiment 2, and Embodiment 3, the format of the Common info field of the MAP TF may be the format illustrated in FIG. 20 instead of the format illustrated in FIG. 5. Further, the format of the User info field of the MAP TF may be the format illustrated in FIG. 21 instead of the format illustrated in FIG. 6. Furthermore, when the formats illustrated in FIGS. 20 and 21 are applied to the MAP TF, information (e.g., a table) on the Trigger frame illustrated in FIG. 22 may be configured instead of the information on the Trigger Type illustrated in FIG. 7.

In FIG. 22, Trigger Type=Multi-AP is added compared to FIG. 7.

For example, UL/DL Flag illustrated in FIG. 20 may be added to Trigger Dependent Common Info illustrated in FIG. 5. Further, for example, AID12 illustrated in FIG. 6 may be changed to AP ID illustrated in FIG. 21 (e.g., an identifier indicating a Shared AP of a notification destination). Furthermore, for example, the MAP Type and the MAP Type Dependent Info may be allocated to a value (e.g., UL HE-MCS or the like) unused at the time of C-SR in the MAPTF illustrated in FIG. 6 or to the Trigger Dependent User Info.

Figure 23:
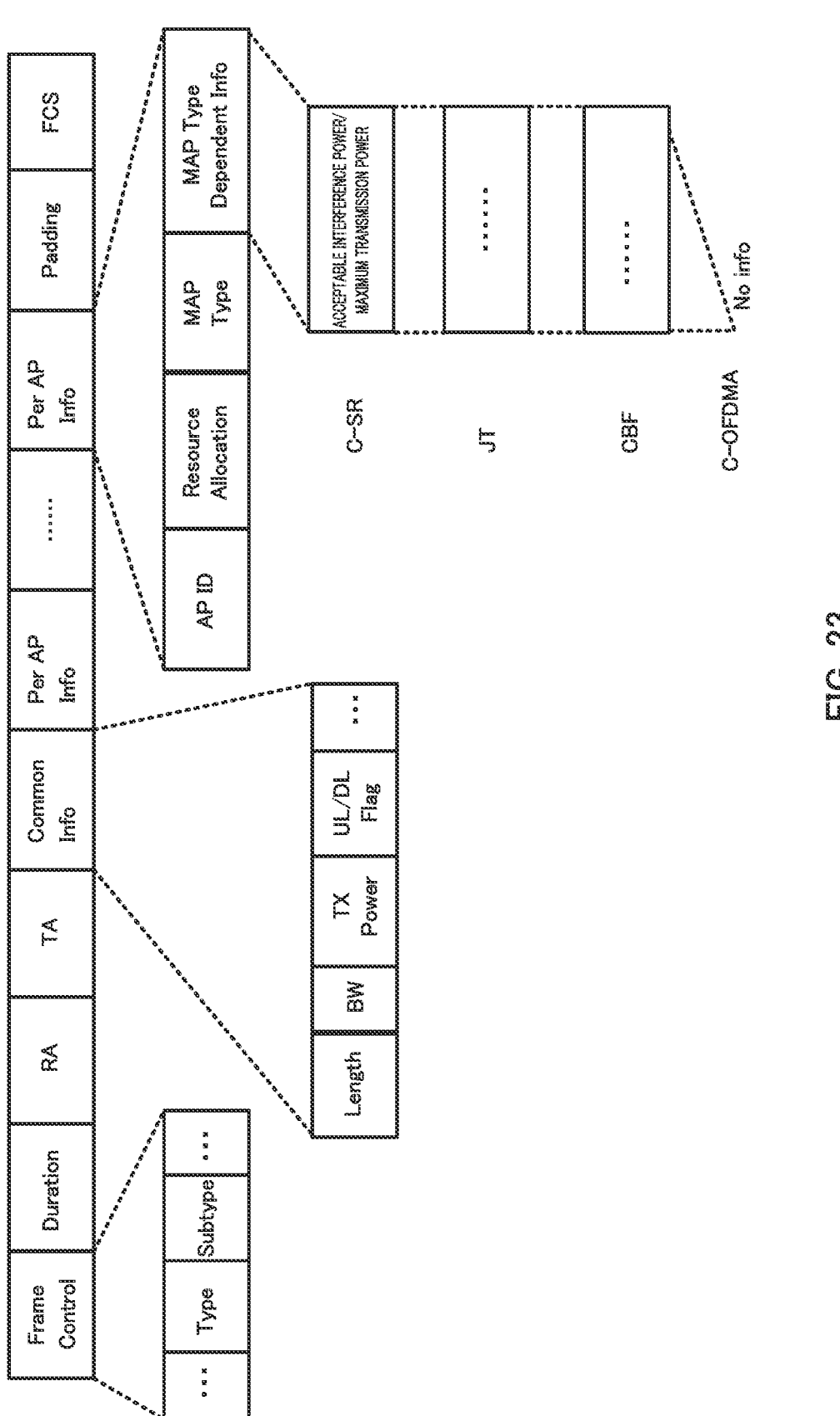
FIG. 23 illustrates an exemplary format of the MAP Trigger frame.

For example, the format of the MAP TF may be different from the format of the Trigger frame. For example, FIG. 23 illustrates an exemplary format of the MAP Trigger frame. In FIG. 23, the type of the frame being "MAP Trigger" may be specified by "Type" and "Subtype" included in the "Frame Control" field, for example. FIG. 24 illustrates exemplary types of the MAC frame specified by Type and Subtype. FIG. 24 is a table in which "MAP Trigger" is added to the types of the MAC frame illustrated in FIG. 4, for example.

In FIG. 23, for example, the "Common Info" field may indicate information common to Shared APs that perform coordinated communication with each other, and the "Per AP info" field may indicate information individual for Shared APs perform coordinated communication with each other.

In addition, in Common Info fields of FIGS. 20 and 23, "Length" may indicate a DATA transmission/reception period including Ack transmission/reception of the Sharing AP, "BW" may indicate a frequency band transmitted/received by the Sharing AP and Shared AP, "TX Power" may indicate a MAP TF transmission power value, and "UL/DL Flag" may indicate a flag indicating a transmission direction (UL communication or DL communication) of DATA of the Sharing AP.

Further, in the User info field illustrated in FIG. 21 and the Per AP Info field illustrated in FIG. 23, "AP ID" may indicate an identifier indicating a Shared AP of a notification destination, "Resource Allocation" may indicate a frequency band that the corresponding Shared AP can use, "MAP Type" may indicate a coordination scheme, and "MAP Type Dependent Info" may indicate information corresponding to the coordination scheme indicated in the MAP Type.

Note that the examples of the MAP Type include C-SR, Joint Transmissions (JT). Coordinated Beamforming (CBF), and Coordinated Orthogonal Frequency Division Multiple Access (C-OFDMA).

For example, in a case where the MAP type indicates C-SR, the acceptable interference power described in Embodiment 1 may be configured in the AP Type Dependent Info when the UL/DL Flag is UL communication, and the maximum transmission power of Shared AP may be configured when the UL/DL Flag is DL communication. Further, the example has been described in which the MAP Type Dependent Info at the time of C-SR is switched between the acceptable interference power and the maximum transmission power based on the UL/DL Flag, but the present disclosure is not limited thereto, and the format may indicate both the acceptable interference power and the maximum transmission power.

Further, for example, the MAP Type Dependent Info when the MAP Type indicates C-OFDMA may be configured with no data.

Further, for example, the validation and invalidation of the transmission power control based on the plurality of transmission power candidates as described in Embodiment 2 and Embodiment 3 may be switched based on the MAP Type. For example, when the MAP Type is C-SR, the operation of the transmission power control based on the plurality of transmission power candidates may be configured as valid, and when the MAP Type is different from C-SR, the operation of the transmission power control based on the plurality of transmission power candidates may be configured as invalid.

Further, the case has been described in which the maximum transmission power of Shared AP is notified in the MAP Type Dependent Info when the MAP Type is C-SR, but the present disclosure is not limited thereto, and the acceptable interference power (e.g., "the path loss between the maximum transmission power-Sharing AP and the Shared AP") may be notified.

Variation 2 has been described above.

Note that in each of the above-described embodiments, the case has been described in which the number of APs 100

(associated AP) with which STA 200 associates is one, but the present disclosure is not limited thereto, and STA 200 may associate with a plurality of APs 100. For example, similarly to above-described Embodiment 1, STA 200 may notify the plurality of associated APs of the path loss based on signals from a plurality of APs 100 including a plurality of associated AP, and the plurality of associated APs may control the transmission power of STA 200. Further, similarly to above-described Embodiment 2 and Embodiment 3, STA 200 may control transmission power of the uplink based on signals from the plurality of APs 100 including the plurality of associated APs.

In the above-described embodiments, the case has been described in which a plurality of APs perform coordinated communication with an STA, but the present disclosure is not limited thereto. For example, in Embodiments 2 and 3, the transmission sources of the plurality of signals used for the transmission power control of STA are not limited to APs. For example, some of the plurality of APs may be replaced with STA. For example, the present disclosure may be applied to a case where one or more APs and one or more STAs perform coordinated communication to another STA. Alternatively, the present disclosure may be applied to a case where two or more STAs perform coordinated communication to another STA.

The term representing any signal (packet) in the above embodiments is merely an example, and the present disclosure is not limited thereto.

Any component termed with a suffix, such as "-er," "-or," or "-ar" in the above-described embodiments may be replaced with other terms such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSLs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a radio transceiver and processing/control circuitry. The transceiver may comprise and/or function as a receiver and a transmitter. The radio transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g. cellular (cell) phone, smart phone), a tablet, a personal computer (PC) (e.g, laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure include: control circuitry, which, in operation, determines transmission power of an uplink based on a plurality of signals received from a plurality of transmission sources performing coordinated communication of the uplink; and transmission circuitry, which, in operation, performs uplink transmission with the determined transmission power.

In the embodiment of the present disclosure, the control circuitry determines the transmission power of the uplink based on a plurality of transmission power candidates that are based on the plurality of signals, respectively.

In the embodiment of the present disclosure, the plurality of signals each includes a trigger frame that indicates the uplink transmission.

In the embodiment of the present disclosure, the plurality of signals each includes a trigger frame that indicates initiation of the coordinated communication.

In the embodiment of the present disclosure, the plurality of transmission sources are access points including a first access point and a second access point, and among the access points, an access point of a transmission source to which the terminal connects is the second access point different from the first access point that controls the coordinated communication.

In the embodiment of the present disclosure, resources for trigger frames are different from each other in at least one of a time domain and/or a frequency domain, the trigger frames being the signals transmitted from the plurality of second access points.

In the embodiment of the present disclosure, the control circuitry decides whether to determine the transmission power based on the plurality of signals, based on information included in at least one of the plurality of signals.

In the embodiment of the present disclosure, the information is included in a common information field of a trigger frame that is at least one of the plurality of signals.

In the embodiment of the present disclosure, the information is a type of a trigger frame that is at least one of the plurality of signals.

In the embodiment of the present disclosure, the terminal further includes reception circuitry, which, in operation, receives information on acceptable interference power, and the control circuitry determines the transmission power based on the acceptable interference power.

In the embodiment of the present disclosure, the information on the acceptable interference power is included in a common information field of a trigger frame that is at least one of the plurality of signals.

In the embodiment of the present disclosure, the information on the acceptable interference power is included in a user information field of a trigger frame that is at least one of the plurality of signals.

In the embodiment of the present disclosure, the information on the acceptable interference power is included in a field individual for the terminal in the user information field.

A communication apparatus according to the present disclosure includes: transmission circuitry, which, in operation, transmits information on coordinated communication; and reception circuitry, which, in operation, receives uplink transmission transmitted based on the information on the coordinated communication, wherein transmission power of the uplink transmission is determined based on the information on the coordinated communication.

In a communication method according to the present disclosure, the terminal determines transmission power of an uplink based on a plurality of signals received from a plurality of transmission sources performing coordinated communication of the uplink, and performs uplink transmission with the determined transmission power.

In the communication method according to the present disclosure, the communication apparatus transmits information on coordinated communication, and receives uplink transmission transmitted based on the information on the coordinated communication, and transmission power of the uplink transmission is determined based on the information on the coordinated communication.

The disclosure of Japanese Patent Application No. 2020-174019, filed on Oct. 15, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

10, 200 STA
11 Controller
12 Transmitter
100 AP
101, 201 Transmission packet generator
102, 202 Radio transceiver
103, 203 Reception packet decoder
104, 205 Control signal generator
204 Path loss measurer
206 Transmission power controller

The invention claimed is:

1. A terminal, comprising:

control circuitry, which, in operation, determines transmission power of an uplink based on a first signal received from a first transmission source and a second signal received from a second transmission source, the first transmission source and the second transmission source performing coordinated communication of the uplink; and transmission circuitry, which, in operation, performs uplink transmission with the determined transmission power, wherein the control circuitry, in operation, determines the transmission power of the uplink based on a first information included in the first signal and a second information included in the second signal.

2. The terminal according to claim 1, wherein the control circuitry determines the transmission power of the uplink based on a first transmission power candidate and a second transmission power candidate that are based on the first signal and the second signal, respectively.

3. The terminal according to claim 1, wherein each of the first signal and the second signal includes a trigger frame that indicates the uplink transmission.

4. The terminal according to claim 1, wherein each of the first signal and the second signal includes a trigger frame that indicates initiation of the coordinated communication.

5. The terminal according to claim 1, wherein the first transmission source and the second transmission source are respectively a first access point (AP1) and a second access point (AP2), and the terminal is associated with the second access point (AP2) different from the first access point (AP1) that controls the coordinated communication.

6. The terminal according to claim 5, wherein resources for trigger frames are different from each other in at least one of a time domain and/or a frequency domain, the trigger frames being signals transmitted from a plurality of the second access points (AP2s).

7. The terminal according to claim 1, wherein the control circuitry decides whether to determine the transmission power based on the first signal and the second signal, based on information included in at least one of the first signal or the second signal.

8. The terminal according to claim 7, wherein the information is included in a common information field of a trigger frame that is at least one of the first signal or the second signal.

9. The terminal according to claim 7, wherein the information is a type of a trigger frame that is at least one of the first signal or the second signal.

10. The terminal according to claim 1, further comprising reception circuitry, which, in operation, receives information on acceptable interference power, wherein the control circuitry determines the transmission power based on the acceptable interference power.

11. The terminal according to claim 10, wherein the information on the acceptable interference power is included in a common information field of a trigger frame that is at least one of the first signal or the second signal.

12. The terminal according to claim 10, wherein the information on the acceptable interference power is included in a user information field of a trigger frame that is at least one of the first signal or the second signal.

13. The terminal according to claim 12, wherein the information on the acceptable interference power is included in a field individual for the terminal in the user information field.

14. A communication method, comprising:

determining, by a terminal, transmission power of an uplink based on a first signal received from a first transmission source and a second signal received from a second transmission source, the first transmission source and the second transmission source performing coordinated communication of the uplink, and performing, by the terminal, uplink transmission with the determined transmission power, wherein the transmission power of the uplink is determined based on a first information included in the first signal and a second information included in the second signal.

* * * * *